United States Patent
Zhao et al.

(10) Patent No.: US 9,722,678 B2
(45) Date of Patent: Aug. 1, 2017

(54) COORDINATED MULTI-POINT TRANSMISSION METHOD AND EQUIPMENT

(71) Applicant: China Academy of Telecommunications Technology, Beijing (CN)

(72) Inventors: Yali Zhao, Beijing (CN); Zhe Fu, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 41 days.

(21) Appl. No.: 14/759,412

(22) PCT Filed: Dec. 23, 2013

(86) PCT No.: PCT/CN2013/090179
§ 371 (c)(1),
(2) Date: Jul. 7, 2015

(87) PCT Pub. No.: WO2014/108023
PCT Pub. Date: Jul. 17, 2014

(65) Prior Publication Data
US 2015/0349854 A1    Dec. 3, 2015

(30) Foreign Application Priority Data
Jan. 11, 2013   (CN) .......................... 2013 1 0011749

(51) Int. Cl.
*H04B 7/024*   (2017.01)
*H04W 24/10*   (2009.01)
(Continued)

(52) U.S. Cl.
CPC .......... *H04B 7/024* (2013.01); *H04B 7/0626* (2013.01); *H04W 24/10* (2013.01); *H04W 72/042* (2013.01)

(58) Field of Classification Search
None
See application file for complete search history.

(56) References Cited

U.S. PATENT DOCUMENTS

2011/0199986 A1* 8/2011 Fong ..................... H04L 5/0035
                                                        370/329
2012/0287799 A1   11/2012 Chen et al.
(Continued)

FOREIGN PATENT DOCUMENTS

CN   102378308 A   3/2012
CN   102487532 A   6/2012
(Continued)

OTHER PUBLICATIONS

The Extended European Search Report issued on Nov. 9, 2015 in the EP counterpart application (13871033.0).
International Search Report for PCT/CN2013/090179.

*Primary Examiner* — Kodzovi Acolatse
(74) *Attorney, Agent, or Firm* — Kilpatrick Townsend & Stockton LLP

(57) ABSTRACT

Disclosed in the present invention are a coordinated multi-point transmission method and network equipment. In the present invention, a CoMP (Coordinated Multi-Point) auxiliary node provides CoMP auxiliary information for CoMP-participating cells via inter-cell interfaces, in order to assist the CoMP-participating cells in realizing CoMP.

4 Claims, 10 Drawing Sheets

(51) Int. Cl.
*H04B 7/06* (2006.01)
*H04W 72/04* (2009.01)

(56) References Cited

U.S. PATENT DOCUMENTS

2013/0279437 A1* 10/2013 Ng .................. H04W 48/16
                                             370/329
2015/0318966 A1* 11/2015 Liu ................. H04W 28/16
                                             370/329

FOREIGN PATENT DOCUMENTS

| | | |
|---|---|---|
| WO | 2010124241 A2 | 10/2010 |
| WO | 2011100672 A1 | 8/2011 |
| WO | 2012093858 A2 | 7/2012 |
| WO | 2012108807 A1 | 8/2012 |
| WO | 2012124552 A1 | 9/2012 |

* cited by examiner for the priority to Chinese Patent Application No. 201310011749.1, filed with the State Intellectual Property Office of People's Republic of China on Jan. 11, 2013 and entitled "Coordinated multi-point transmission method and device", the content of which is hereby incorporated by reference in its entirety.

COORDINATED MULTI-POINT TRANSMISSION METHOD AND EQUIPMENT

CROSS-REFERENCES TO RELATED APPLICATION

This application is a US National Stage of International Application No. PCT/CN2013/090179, filed on Dec. 23, 2013, designating the United States and claiming the priority

FIELD

The present invention relates to the field of wireless communications and particularly to a coordinated multi-point transmission method and device.

BACKGROUND

FIG. 1 illustrates the network architecture of an Evolved Universal Terrestrial Radio Access Network (E-UTRAN), where a Mobility Management Entity (MME) is connected with an evolved Node B (eNB) via an S1-MME interface; and the eNB functions as an access network and communicates with a User Equipment (UE) via an air interface. Each UE attached to the network is served by an MME which is referred to a serving MME of the UE. The S1-MME interface which provides the UE with control plane services including mobility management and bearer management functions. A Serving Gateway (S-GW) is connected with the eNB via an S1-U interface, and each UE attached to the network is served by an S-GW which is referred to as a serving S-GW of the UE. The S1-U interface provides the UE with user plane services, and user plane data of the UE is transmitted between the S-GW and the eNB over an S1-U General Packet Radio Service (GPRS) Tunnel Protocol (GTP) bearer.

The traditional scheme of single-layer network coverage by a macro eNB has been unable to satisfy a constantly growing demand of subscribers for a data service rate and a service capacity, so layered network deployment has been introduced to address the problem in that some low-power eNBs (referred below to as local eNBs in the femto, pico, relay or other forms) are deployed in a hotspot area, a home indoor environment, an office environment or other small-coverage environments, to provide small coverage (i.e., small cell), thereby splitting a cell so as to enable an operator to provide a subscriber with a service at a higher data rate and a low cost.

FIG. 2 illustrates the layered heterogeneous network architecture including a Local eNB and a Micro eNB, where the Macro eNB provides underlying coverage, and the Local eNB (i.e., a small cell) provides hotspot coverage; and there is a data/signaling interface (which can be a wired or radio interface) between the small cell and the macro eNB.

Since a small cell controlled by the local eNB has such a small coverage area that there are a small number of UEs served by the cell, a UE connected with the local eNB tends to be provided with a higher quality of service, e.g., a higher service rate, a link with a higher quality, etc. When a UE connected with the macro eNB is proximate to the cell controlled by the local eNB, the UE can be switched to the small cell served by the local eNB; and when the UE is remote from the small cell served by the local eNB, the UE needs to be switched to a cell controlled by the macro eNB to keep wirelessly connected.

In order to address the problem of mobility in the heterogeneous network, the scheme of network deployment with bearer separation has been introduced so that Radio Resource Control (RRC) connections of the UE are maintained only at the macro eNB, and all or a part of data bearers thereof are transferred to the local eNB for transmission.

FIG. 3 illustrates such a network architecture with bearers being separated, under this network architecture, all of Signaling Radio Bearers (SRBs) of the UE are maintained at the macro eNB, and all or a part of Data Radio Bearers (DRBs) are transferred to the local eNB for transmission, where an interface represented in a dotted line exist only if a part of the DRBs are bearer separated.

FIG. 4 illustrates another such a network architecture with bearers being separated that all or a part of DRBs can be transferred to the local eNB for transmission.

In the heterogeneous network, there may be several small cells in the macro coverage area, and these small cells may overlap in coverage area with each other. If the UE is located in an area covered by more than one of the small cells, then the UE may receive signals concurrently from the more than one small cell, and these signals may interfere strongly with each other. In order to the address the problem of interference, the Coordinated Multiple-Point Transmission/Reception (CoMP) mechanism may be introduced between the small cells to suppress the interference so as to improve the quality of receiving the signals by the UE.

The CoMP refers to that a plurality of transmission points separate in geographical location cooperate to participate in transmitting data to a UE or receiving jointly data transmitted by the UE. Generally the plurality of transmission points are eNBs of different cells or a plurality of Remote Radio Heads (RRHs) controlled by the same eNB. Interference between the plurality of transmission points can be lowered effectively by coordinated scheduling, pre-coding, joint transmission, etc., between the plurality of transmission points to thereby improve the throughput of a user covered in the cooperation area, particularly an edge user covered by the coordinating points.

Related terms in the CoMP are defined as follows:
Points: a set of transmit antennas using the same address in geographical location, where different sectors of the same site are different points.
A CoMP serving cell: a cell transmitting CoMP-related Physical Downlink Control Channel (PDCCH) scheduling information.
A CoMP resource management set: the UE makes Channel State Reference Signal-Reference Signal (CSI-RS)-based Reference Signal Received Power (RSRP) and/or Reference Signal Received Quality (RSRQ) measurement, and reports a measurement result to the CoMP serving cell, and the CoMP serving cell manages a CoMP measurement set based upon the RSRP and/or RSRQ measurement result by determining the measurement CoMP set and determining a point to be added to or deleted from the CoMP measurement set.
A CoMP measurement set: the CoMP measurement set is determined from the measurement result by the CoMP resource management set or is determined from a Radio Resource Management (RRM) measurement result of mobility measurement or may be even determined from a Sounding Reference Signal (SRS) using channel reciprocity in a Time Division Duplex (TDD) system. The UE performs CSI measurement in the CoMP measurement set and reports CSI measurement results to the CoMP serving cell to determine a CoMP cooperating set and the CoMP transmission points.

A CoMP cooperating set: a set of points participating directly or indirectly in transmitting or receiving data. The CoMP cooperating set may or may not be transparent to the UE. The CoMP cooperating set is determined from the CSI measurement results of the CoMP measurement set and can further be determined from the SRS using the channel reciprocity for the TDD system.

CoMP transmission points: one point or a set of points in the CoMP cooperating set to participate directly in transmitting data to the UE. The CoMP transmission points are determined from the CSI reported for the CoMP measurement set or determined using the channel reciprocity for the TDD system.

CoMP reception points: one point or a set of points in the CoMP cooperating set to receive data of the UE. The CoMP reception points can be determined from the SRS.

The CoMP is further categorized into Downlink (DL) CoMP and Uplink (UL) CoMP based on different transmission directions as described below respectively:

(1) DL CoMP:

For the DL CoMP, the UE receives scheduling information carried on the PDCCH from only one transmission point but can receive data concurrently from one or more transmission points. The DL CoMP is categorized into Joint Processing (JP) and Coordinated Scheduling/Beam-forming (CS/CB).

The JP is further categorized into Joint Transmission (JT) and Dynamic Point Selection/Muting (DPS). The JT refers to that all or a part of the points in the CoMP cooperating set transmit data concurrently to one or more UE; and the DPS refers to that only one point in the CoMP cooperating set transmits data concurrently for the UE at any time. The selected transmission point can vary over time. The JT and the DPS can be applied jointly.

The CS/CB is characterized in that there is only one such point in the CoMP cooperating set that has traffic data of the UE and that will transmit the data to the UE, whereas the other points will feed scheduling or beam-forming information back to the transmission point. For example, time and frequency resources utilized for transmission can be coordinated between the points in the CoMP cooperating set in the CS to thereby lower interference as much as possible. The JP and the CS/CB can also be applied jointly.

(2) The UL CoMP

For the UL CoMP, the UE receives the PDCCH from one transmission point, but Physical Uplink Shared Channel (PUSCH) transmission can be received concurrently by one or more transmission points. The UL CoMP is categorized in to Joint Reception (JR) and Coordinated Scheduling/Beam-forming (CS/CB). The JR refers to that a PUSCH transmitted by the UE can be received concurrently by all or a part of the points in the CoMP cooperating set to thereby improve the quality of receiving a signal. The CS/CB like the downlink CS/CB refers to that the points in the CoMP cooperating set are coordinated to be scheduled.

For the heterogeneous network with bearers being separated, since there may be a significant delay between the macro cell, and the small cell participating in bearer separation, there may be a limited gain of the CoMP applied between the macro cell, and the small cell participating in separating the bearers, but there may be a better delay, and a higher gain of the CoMP, between cells overlapping in coverage with the small cell participating in separating the bearers, and the small cell, so the CoMP may be applied between the small cell and the other cells to thereby improve the performance of the system.

However in the architecture with bearers being separated, all of RRC functions of the UE may be arranged in the macro cell, and both measurement configuration and measurement result reception is performed via RRC signaling, so the measurement configuration and the measurement result reception can only be performed in the macro cell, and even also CSI information can only be fed back in the macro cell. It is thus desirable to address the issue of obtaining a measurement result on the small cell for the purpose of the CoMP between the small cell and another cell overlapping in coverage area therewith (the macro cell where non-UE RRC connections are active).

SUMMARY

Embodiments of the invention provide a coordinated multiple-point transmission method and device so that a CoMP assisting point assists a CoMP participating cell in performing CoMP.

An embodiment of the invention provides a coordinated multiple-point transmission method including: receiving, by a CoMP serving cell, assistance information transmitted by a CoMP assisting point via an inter-cell interface, the assistance information is utilized for assisting the CoMP serving cell in making a CoMP decision.

Another embodiment of the invention provides a coordinated multiple-point transmission method including: transmitting, by a CoMP assisting point, assistance information to a CoMP serving cell via an inter-cell interface to assist the serving cell in making a CoMP decision.

An embodiment of the invention provides a network device including: a receiving module configured to receive assistance information transmitted by a CoMP assisting point via an inter-cell interface, the assistance information is utilized for assisting the device in making a CoMP decision.

An embodiment of the invention provides another network device including: a transmitting module configured to transmit assistance information to a CoMP serving cell via an inter-cell interface to assist the serving cell in making a CoMP decision.

An embodiment of the invention provides still another network device including: a receiving module configured to receive assistance information transmitted by a CoMP assisting point via an inter-cell interface, the assistance information is utilized for assisting the device in making a CoMP decision.

An embodiment of the invention provides a further network device including: a second transceiver configured to transmit assistance information to a CoMP serving cell via an inter-cell interface to assist the serving cell in making a CoMP decision.

In the embodiments above of the invention, the CoMP assisting point transmits the assistance information to the CoMP serving cell to thereby assist the CoMP serving cell in making a CoMP decision.

BRIEF DESCRIPTION OF THE DRAWINGS

The drawings below merely illustrative some examples of the technical solutions of the invention, but the invention will not be limited to the features illustrated in the drawings in which like reference numerals denote like element. In the drawings.

DETAILED DESCRIPTION OF THE EMBODIMENTS

For the sake of a concise and intuitive description, the solution of the invention will be set forth in the following description of several representative embodiments. Numerous details in the embodiments are merely intended to facilitate understanding of the solution of the invention. However apparently the technical solution of the invention can be implemented without these details. In order not to unnecessarily obscure the solution of the invention, some embodiments will not be described in details but only outlined. In the following, the term "include" refers to "include but will not be limited to", the phrase "according to . . . " refers to "at least but not limited to according to . . . ". When the number of some component is not particularly described in the following due to the custom of the Chinese language, it means that the component can include a plurality of components or can be interpreted as at least one component.

The embodiments of the invention suggest such a solution that a CoMP assisting point assists another CoMP participating cell in performing CoMP, that is, the CoMP assisting point provides the CoMP participating cell with assistance information via an inter-cell interface to assist the CoMP participating cell in performing CoMP. Furthermore the CoMP assisting point here refers to a point capable of configuring and/or receiving all or a part of CoMP related measurement information. The CoMP related measurement information includes but will not be limited to CSI-RS based RSRP/RSRQ measurement and/or CRS-based RSRP/RSRQ measurement and/or CSI-RS based CSI measurement. The following embodiments of the invention will be described taking as an example the CoMP assisting point which is a Macro cell.

The embodiments of the invention will be described below in details with reference to the drawings.

In the following respective embodiments, the CoMP assisting point will be referred to as a Macro cell capable of configuring and/or receiving all or a part of CoMP related measurement information, and the CoMP participating points will be referred to as a cell_1 and a cell_2, where the cell_1 is a CoMP serving cell, and the cell_2 is a cell overlapping in coverage area with the cell_1 and to perform CoMP together with the cell_1.

Figure 1:
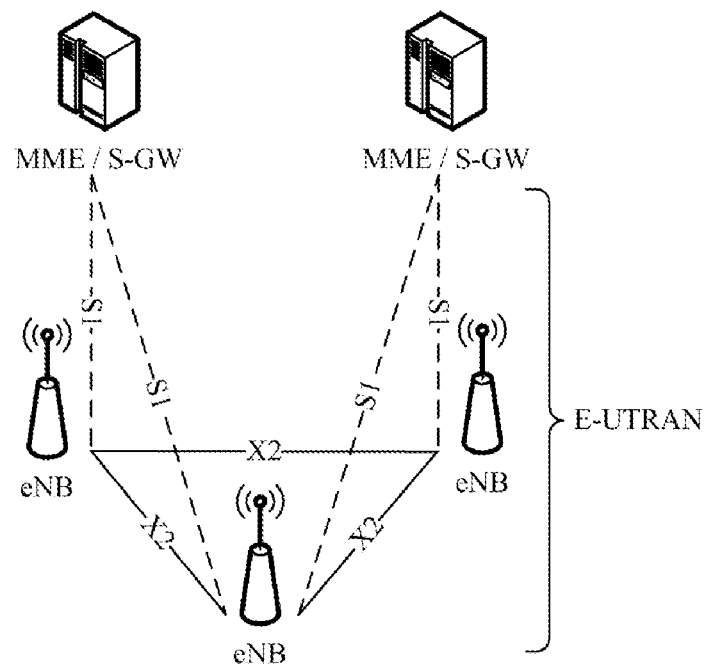
FIG. 1 illustrates a schematic diagram of the network architecture of the E-UTRAN in the prior art.
Figure 2:
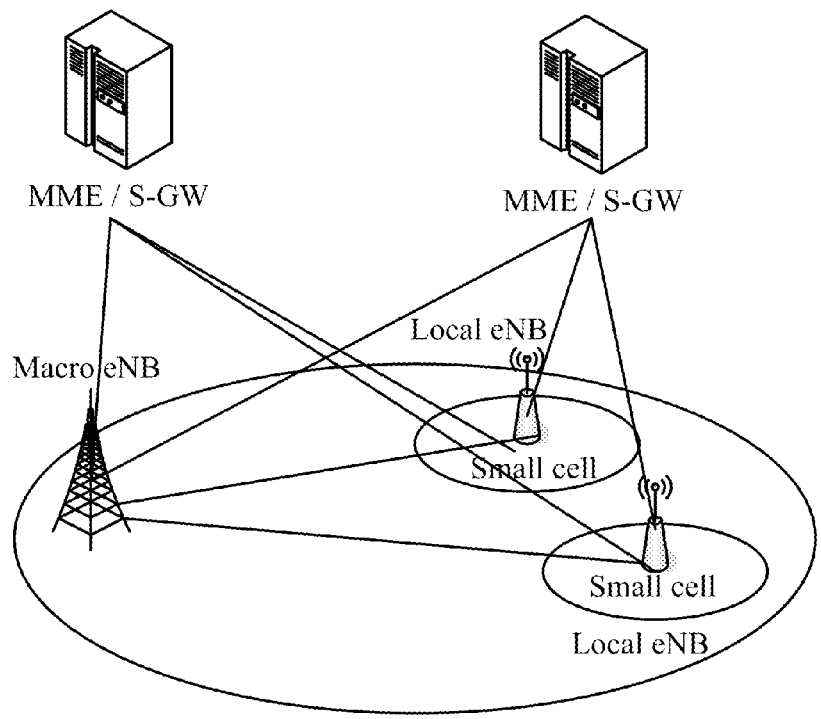
FIG. 2 illustrates a schematic diagram of the layered network deployment scenario in the prior art.
Figure 3:
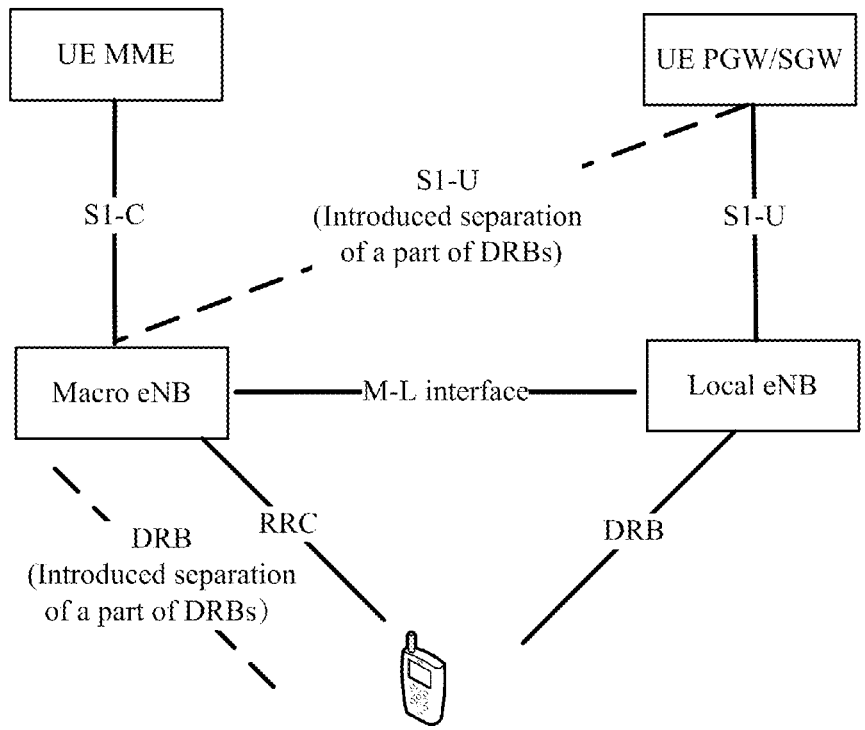
FIG. 3 illustrates a schematic diagram of the architecture with the control plane being separated from the user plane in the prior art.
Figure 4:
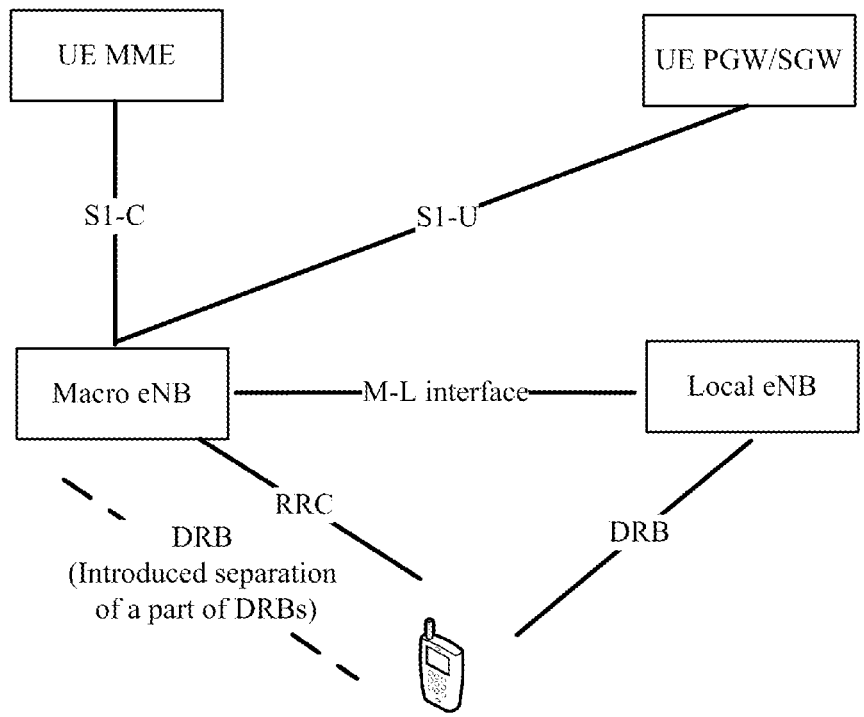
FIG. 4 illustrates a schematic diagram of another architecture with the control plane being separated from the user plane in the prior art.
Figure 5:
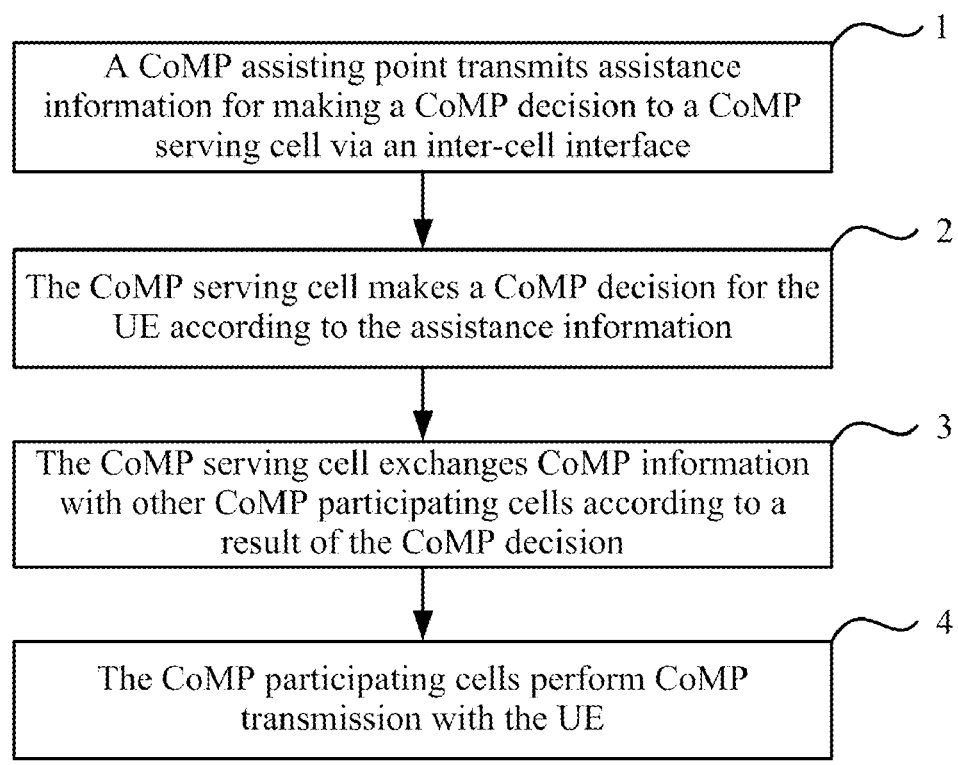
FIG. 5 illustrates a schematic diagram of a general flow of CoMP according to embodiments of the invention.

FIG. 5 illustrates a general flow of the embodiments of the invention, which includes:

Operation 1: A CoMP assisting point (e.g., a Macro eNB) transmits assistance information for making a CoMP decision to a CoMP serving cell via an inter-cell interface;

Operation 2: The CoMP serving cell makes a CoMP decision for the UE according to the assistance information;

Operation 3: The CoMP serving cell exchanges CoMP information with other CoMP participating cells according to a result of the CoMP decision; and Operation 4: The CoMP participating cells perform CoMP transmission with the UE.

First Embodiment

As described in this embodiment, the Macro cell transmits the RSRP and/or RSRQ (hereinafter referred to as RSRP/RSRQ) measurement result reported by the UE to the cell_1, which is the CoMP serving cell, as the assistance information for a CoMP decision to assist the cell_1 in determining a CoMP measurement set. Furthermore the Macro cell can further transmit CSI measurement results in a CoMP measurement set reported by the UE to the cell_1 as the assistance information for a CoMP decision to assist the cell_1 in determining a CoMP cooperating set, a CoMP algorithm, and CoMP transmission points and CoMP reception points so as to assist the cell_1 in performing CoMP with the other cells.

Figure 6:
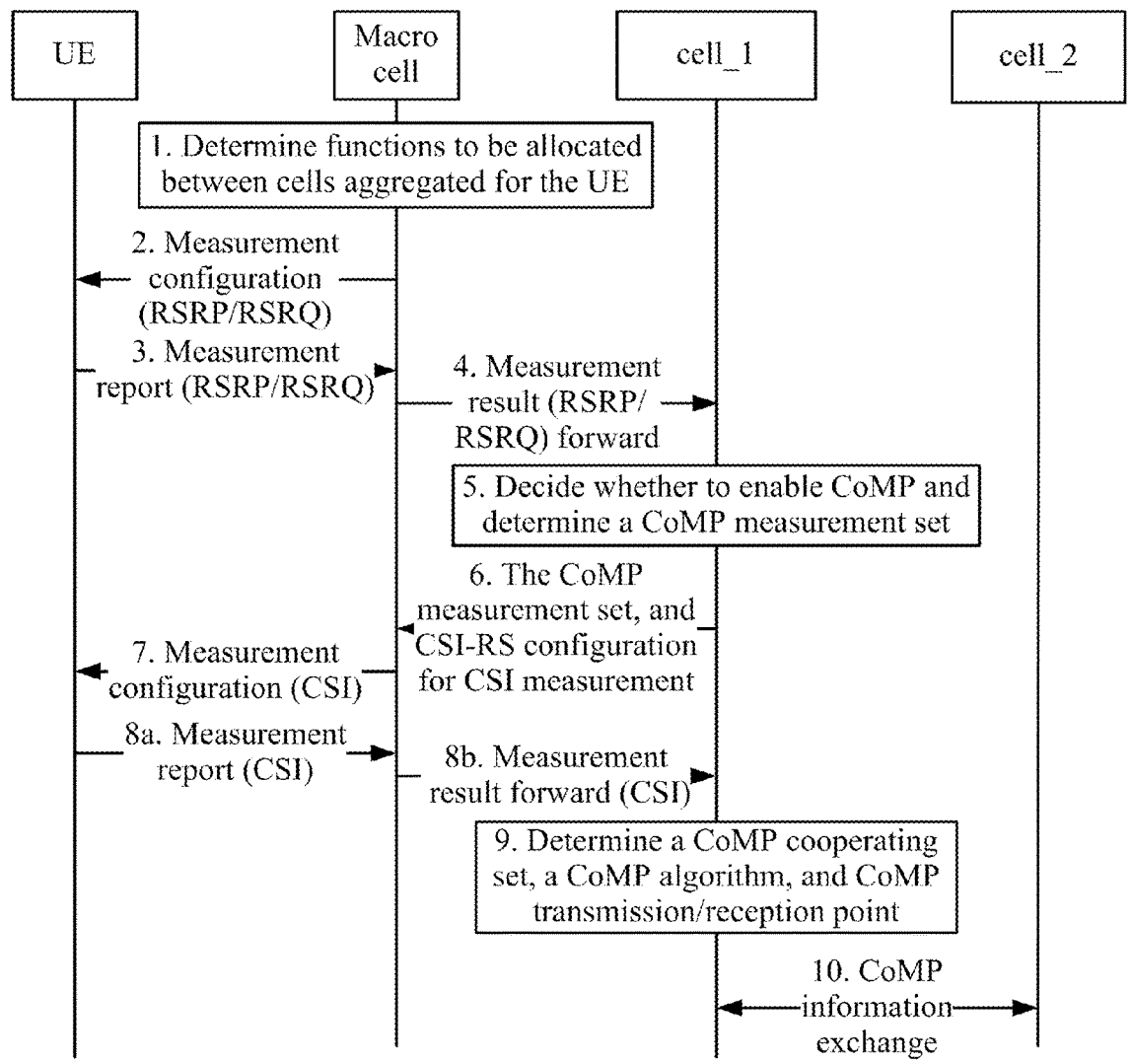
FIG. 6 illustrates a schematic flow chart of CoMP according to a first embodiment of the invention.

Referring to FIG. 6, there is illustrated a schematic flow chart of CoMP according to a first embodiment of the invention, and as illustrated, the flow can include:

The operation 1 is to determine functions to be allocated between cells aggregated for a UE.

After the UE accesses a network, a Macro cell selects other cells, e.g., the cell_1, which can be aggregated for the UE, according to a traffic condition of the UE, the location of the UE, or a measurement result of the UE, and limits a part of functions (e.g., functions of measurement configuration and measurement result reception) to maintenance by only the macro cell.

Operation 2: The Macro cell performs measurement configuration on the UE. For example, the UE can be configured to make Common Reference Signal (CRS) or CSI-RS based RSRP measurement; or the UE can be configured to make CRS or CSI-RS based RSRQ measurement; or the UE can be configured to make CRS or CSI-RS based RSRP measurement and CSI-RS based RSRQ measurement.

Operation 3: When a measurement report condition is satisfied, the UE reports RSRP/RSRQ measurement results and cell identifiers corresponding to the RSRP/RSRQ measurement results to the Macro cell.

Operation 4: The Macro cell forwards the RSRP/RSRQ measurement results, and the cell identifiers corresponding to the RSRP/RSRQ measurement results, reported by the UE to the cell_1 via an interface between the Macro cell and the cell_1.

In this operation, the Macro cell may forward all the RSRP/RSRQ measurement results, and if all the RSRP/RSRQ measurement results are forwarded, then the Macro cell may further need to carry cell frequency information. The macro cell may alternatively forward only the RSRP/RSRQ measurement results of cells at the same frequency as the cell intended to receive the measurement results (the cell_1 here).

Operation 5: The cell_1 determines from the RSRP/RSRQ measurement results whether to enable CoMP, and if CoMP is determined to be enabled, then the cell_1 further needs to determine a CoMP measurement set. The CoMP measurement set can be determined under a number of criteria; for example, the cells with the highest RSRP or RSRQ are selected according to the limited size of the CoMP measurement set. Furthermore the cell_1 further needs to determine CSI-RS configuration for CSI measurement in the CoMP measurement set after determining the CoMP measurement set.

Operation 6: The cell_1 transmits the CoMP measurement set, and information about the CSI-RS configuration for CSI measurement in the CoMP measurement set to the Macro cell.

Operation 7: The Macro cell configures the UE to make CSI-RS based CSI measurement.

Operations 8a to 8b: When a measurement report condition is satisfied, the UE reports CSI measurement results in the CoMP measurement set to the Macro cell, and the Macro cell forwards the CSI measurement results to the cell_1.

Operation 9: The cell_1 determines a CoMP cooperating set and a CoMP algorithm according to the CSI measurement results in the CoMP measurement set, and selects CoMP the transmission point and CoMP reception point according to the CoMP algorithm and the CSI measurement results.

Operation 10: The cell_1 exchanges CoMP information with the other CoMP participating cells, e.g., the cell_2, and performs CoMP transmission together therewith.

In this operation, the information exchanged between the cell_1 and the cell_2 is dependent upon the CoMP algorithm. Furthermore, if the CoMP participating small cells are served by different eNB nodes, then inter-eNB interaction needs to be introduced.

The cell_1 which is the CoMP serving cell may exchange the following CoMP information with the other CoMP participating cells in the CoMP algorithm:

If the CoMP algorithm is DL JT/DPS, then the exchanged CoMP information includes at least one of:

A bit stream transmitted by the CoMP serving cell to the other transmission points in the CoMP cooperating set to be transmitted at the physical layer, and a time-frequency resource over which the bit stream is transmitted; and The position of a starting symbol of a Physical Downlink Shared Channel (PDSCH) indicated by the CoMP serving cell to the other transmission points in the CoMP cooperating set;

If the CoMP algorithm is DL CS/CB, then the exchanged CoMP information includes at least one of:

Beam-forming reference information;

Temporal information between the respective transmission points in coordinated scheduling; and Coordination information of frequency resources between the respective transmission points in coordinated scheduling;

If the CoMP algorithm is UL JR, then the exchanged CoMP information includes at least one of:

Time-frequency resource information of PUSCH reception transmitted by the CoMP serving cell to the CoMP reception points; and Received bit information fed back by the CoMP reception points to the CoMP serving cell for reception combination; and If the CoMP algorithm is UL CS/CB, then the exchanged CoMP information includes at least one of:

Beam-forming information exchanged between the CoMP serving cell and the other CoMP participating cells in the CoMP cooperating set; and Time-frequency resource coordination information on the respective cells exchanged between the CoMP serving cell and the other CoMP participating cells in the CoMP cooperating set.

Optionally the cell_1 can alternatively determine only the CoMP measurement set in the operation 5 of the flow above, but the CSI-RS measurement configuration information can be determined by the Macro cell. If this option is enabled, then only information about the CoMP measurement set needs to be transmitted in the operation 6.

Optionally the UE can alternatively transmit the CSI measurement results to the cell_1 without forwarding by the Macro cell in the operation 8 of the flow above.

Optionally in the flow above, the cell_1 can configure the UE to make CSI-RS based CSI measurement, after determining the CoMP measurement set and the CSI-RS configuration information for CSI measurement in the CoMP measurement set (operation 5).

Furthermore the cell_1 can further adjust the CoMP measurement set according to the RSRP and/or RSRQ measurement result in a flow similar to the flow above, so a detailed description thereof will be omitted here.

Second Embodiment

As described in this embodiment, the Macro cell transmits an RSRP/RSRQ measurement result reported by the UE to the cell_1, which is the CoMP serving cell, as the assistance information for a CoMP decision to assist the cell_1 in determining a CoMP measurement set. Furthermore the cell_1 will further transmit time-frequency resource information for receiving SRS to the transmission points in the CoMP measurement set, and determines a CoMP cooperating set, a CoMP algorithm, and CoMP transmission points and CoMP reception points according to SRS detection results transmitted by these transmission points so as to enable the cell_1 to perform CoMP with the other cells.

Figure 7:
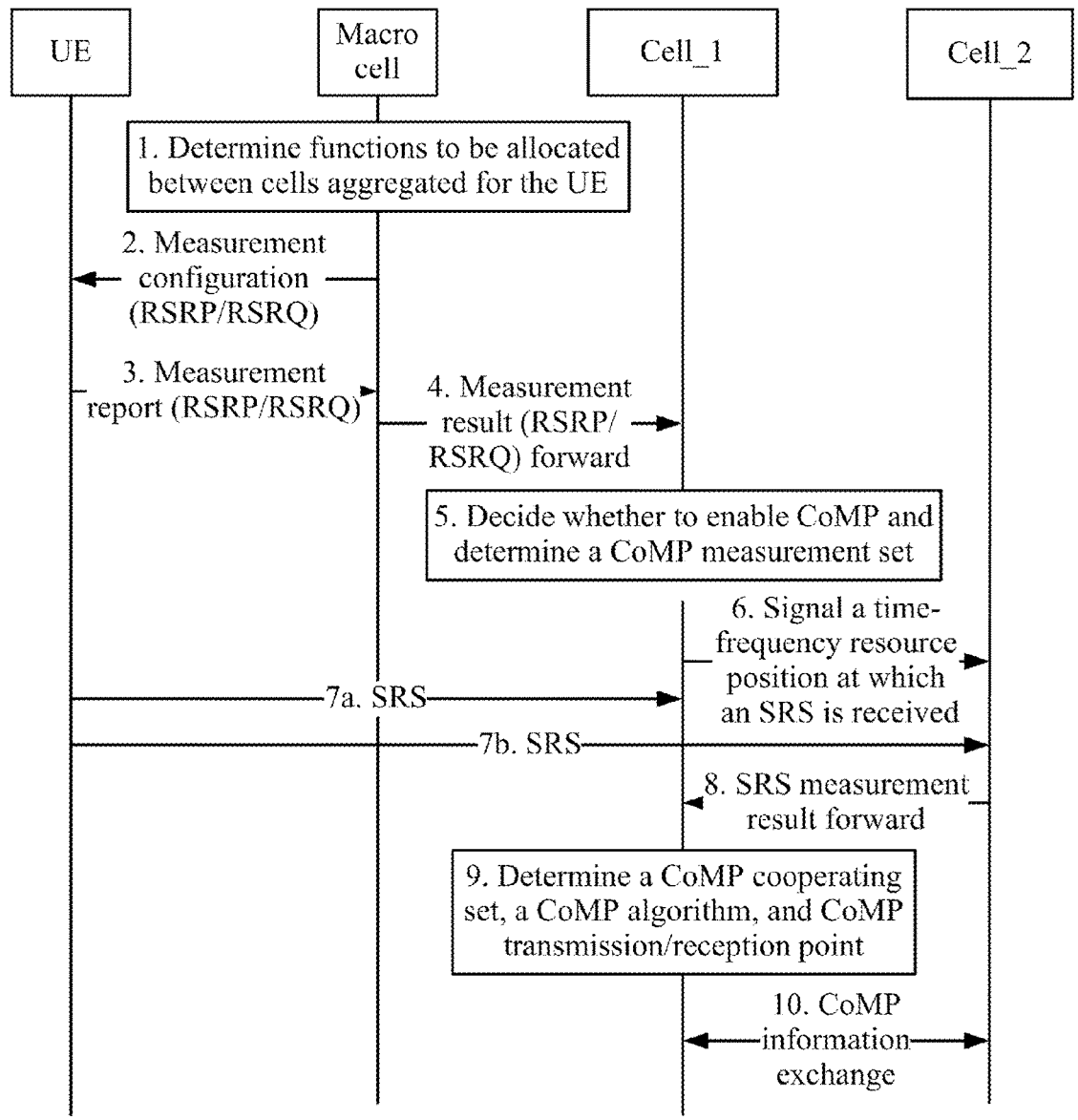
FIG. 7 illustrates a schematic flow chart of CoMP according to a second embodiment of the invention.

Referring to FIG. 7, there is illustrated a schematic flow chart of CoMP according to a second embodiment of the invention, and as illustrated, the flow can include:

The operation 1 is to determine functions to be allocated between cells aggregated for a UE.

After the UE accesses a network, a Macro cell selects other cells, e.g., the cell_1, which can be aggregated for the UE, according to a traffic condition of the UE, the location of the UE, or a measurement result of the UE, and limits a part of functions (e.g., functions of measurement configuration and measurement result reception) to maintenance by only the Macro cell.

Operation 2: The Macro cell configures the UE to make RSRP/RSRQ measurement. A particular implementation of this operation is the same as the operation 2 in FIG. 6.

Operation 3: When a measurement report condition is satisfied, the UE reports RSRP/RSRQ measurement results, and cell identifiers corresponding to the RSRP/RSRQ measurement results to the Macro cell.

Operation 4: The Macro cell forwards the RSRP/RSRQ measurement results, and the cell identifiers corresponding to the RSRP/RSRQ measurement results, reported by the UE to the cell_1 via an interface between the Macro cell and the cell_1.

In this operation, the Macro cell may forward all the RSRP/RSRQ measurement results, and if all the RSRP/RSRQ measurement results are forwarded, then the Macro cell may further need to carry cell frequency information. The Macro cell may alternatively forward only the RSRP/RSRQ measurement results of cells at the same frequency as the cell intended to receive the measurement results (the cell_1 here).

Operation 5: The cell_1 determines from the RSRP/RSRQ measurement results whether to enable CoMP, and if CoMP is determined to be enabled, then the cell_1 further needs to determine a CoMP measurement set.

Operation 6: The cell_1 notifies the other transmission points in the CoMP measurement set (e.g., the cell_2) of a time-frequency resource position at which an SRS is to be received.

Operation 7: The UE transmits an SRS signal, and the transmission points in the CoMP measurement set (e.g., the cell_1 and the cell_2) receive the SRS signal.

Operation 8: The other transmission points in the CoMP measurement set feed back a reception condition of the SRS signal to the cell_1 which is the CoMP serving cell, upon reception of the SRS signal.

Operation 9: The cell_1 estimates CSI measurement results in the CoMP measurement set from the SRS signal using channel reciprocity, determines a CoMP cooperating set and a CoMP algorithm according to the estimated CSI measurement results in the CoMP measurement set, and selects the CoMP transmission point and the CoMP reception point according to the CoMP algorithm and the CSI measurement results.

Operation 10: The cell_1 exchanges CoMP information with the other CoMP participating cells, e.g., the cell_2, and performs CoMP transmission together therewith. The information exchanged between the cell_1 and the other CoMP participating cells is dependent upon the CoMP algorithm, and reference can be made to the corresponding description in the first embodiment for a particular implementation thereof.

Furthermore the cell_1 can further adjust the CoMP measurement set according to the RSRP/RSRQ measurement result in a flow similar to the flow above, so a detailed description thereof will be omitted here.

Third Embodiment

As described in this embodiment, the Macro cell determines a CoMP measurement set, and CSI-RS configuration for CSI measurement in the CoMP measurement set according to an RSRP/RSRQ measurement result reported by the UE, and transmits the CoMP measurement set to the cell_1, and CSI measurement results reported by the UE to enable the cell_1 to determine a CoMP cooperating set, a CoMP algorithm, and CoMP transmission points and CoMP reception points so as to enable the cell_1 to perform CoMP with the other cells.

Figure 8:
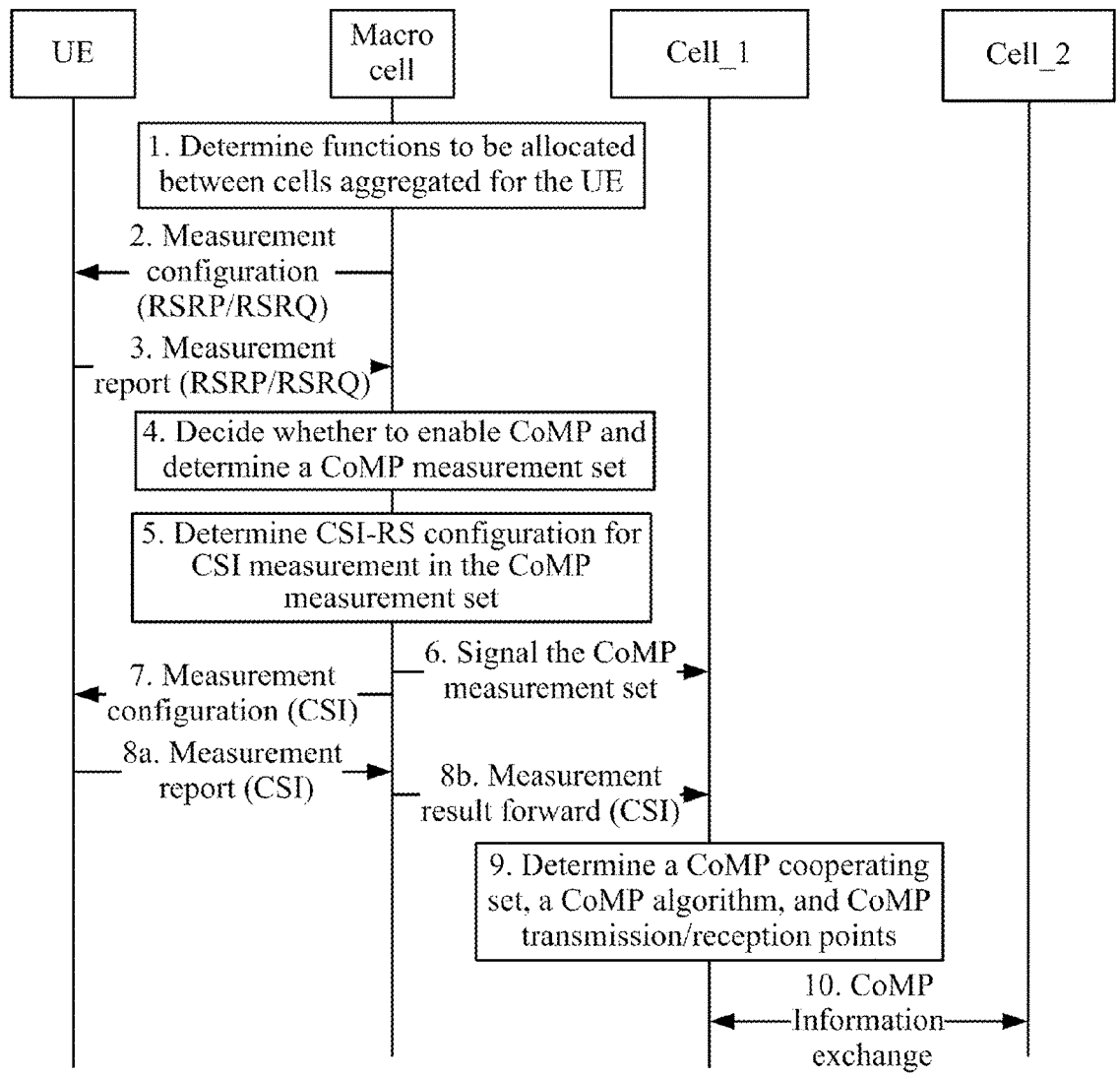
FIG. 8 illustrates a schematic flow chart of CoMP according to a third embodiment of the invention.

Referring to FIG. 8, there is illustrated a schematic flow chart of CoMP according to a third embodiment of the invention, and as illustrated, the flow can include:

The operation 1 is to determine functions to be allocated between cells aggregated for a UE.

After the UE accesses a network, a Macro cell selects other cells, e.g., the cell_1, which can be aggregated for the UE, according to a traffic condition of the UE, the location of the UE, or a measurement result of the UE, and limits a part of functions (e.g., functions of measurement configuration and measurement result reception) to maintenance by only the Macro cell.

Operation 2: The macro cell configures the UE to make RSRP/RSRQ measurement. A particular implementation of this operation is the same as the operation 2 in FIG. 6.

Operation 3: When a measurement report condition is satisfied, the UE reports RSRP/RSRQ measurement results, and cell identifiers corresponding to the RSRP/RSRQ measurement results to the Macro cell.

Operation 4: The Macro cell determines from the RSRP/RSRQ measurement results whether to enable CoMP, and if CoMP is enabled, then the Macro cell determines a CoMP measurement set according to the RSRP/RSRQ measurement results, the limited size of the CoMP measurement set and other factors.

Operation 5: The Macro cell determines CSI-RS configuration for CSI measurement in the CoMP measurement set.

Operation 6: The Macro cell notifies the cell_1 of the CoMP measurement set.

Operation 7: The Macro cell configures the UE to make CSI-RS based CSI measurement.

Operations 8a to 8b: When a measurement report condition is satisfied, the UE reports the CSI measurement results in the CoMP measurement set to the Macro cell, and the Macro cell forwards the CSI measurement results to the cell_1.

Operation 9: The cell_1 determines a CoMP cooperating set and a CoMP algorithm according to the CSI measurement results in the CoMP measurement set, and selects CoMP transmission points and CoMP reception points according to the CoMP algorithm and the CSI measurement results.

Operation 10: The cell_1 exchanges CoMP information with the other CoMP participating cells, e.g., the cell_2, and performs CoMP transmission together therewith. The information exchanged between the cell_1 and the other CoMP participating cells is dependent upon the CoMP algorithm, and reference can be made to the corresponding description in the first embodiment for a particular implementation thereof.

It shall be noted that the operations 5, 6 and 7 in the flow above may not be required to be performed in a strict timing order.

Optionally the cell_1 may configure the UE to make CSI-RS based CSI measurement, upon reception of the CoMP measurement set, and the CSI-RS configuration information for CSI measurement in the CoMP measurement set, transmitted by the Macro cell (operation 5), instead of the Macro cell configuring the UE to make CSI-RS based upon CSI measurement.

Optionally the UE can alternatively transmit the CSI measurement results to the cell_1 without forwarding by the Macro cell in the operation 8 of the flow above.

Furthermore the Macro cell can further adjust the CoMP measurement set according to the RSRP/RSRQ measurement results, and once the CoMP measurement set is adjusted, the Macro cell needs to notify the cell_1 of the adjusted CoMP measurement set in a flow similar to the flow above, so a detailed description thereof will be omitted here.

Fourth Embodiment

As described in this embodiment, the Macro cell determines a CoMP measurement set according to an RSRP/RSRQ measurement result reported by the UE, and transmits the CoMP measurement set to the cell_1 as the assistance information for a CoMP decision to enable the cell_1 to determine a CoMP cooperating set, a CoMP algorithm, and CoMP transmission points and CoMP reception points according to the CoMP measurement set and further in connection with SRS measurement results of the other cells, so as to enable the cell_1 to perform CoMP with the other cells.

Figure 9:
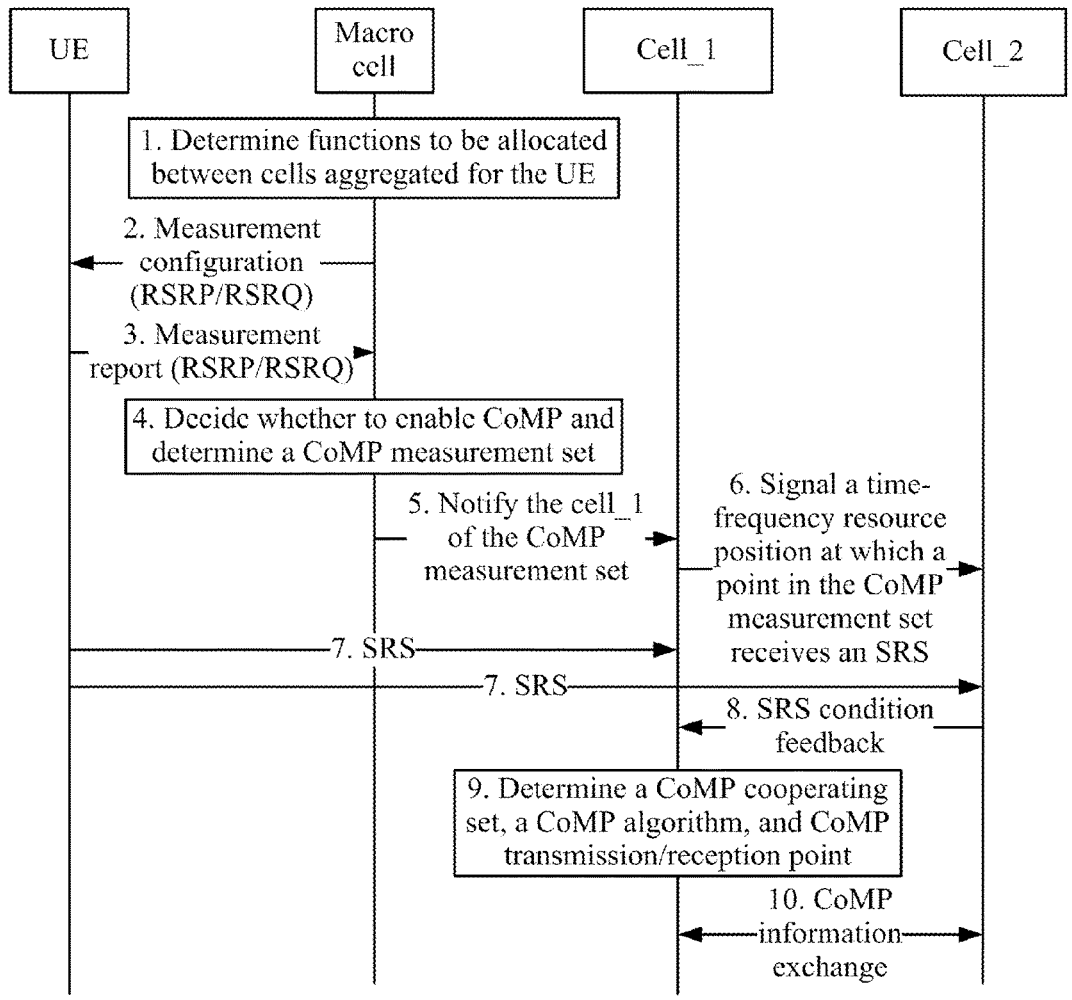
FIG. 9 illustrates a schematic flow chart of CoMP according to a fourth embodiment of the invention.

Referring to FIG. 9, there is illustrated a schematic flow chart of CoMP according to a fourth embodiment of the invention, and as illustrated, the flow can include:

The operation 1 is to determine functions to be allocated between cells aggregated for a UE.

After the UE accesses a network, a Macro cell selects other cells, e.g., the cell_1, which can be aggregated for the UE, according to a traffic condition of the UE, the location of the UE, or a measurement result of the UE, and limits a part of functions (e.g., functions of measurement configuration and measurement result reception) to maintenance by only the macro cell.

Operation 2: The Macro cell configures the UE to make RSRP/RSRQ measurement. A particular implementation of this operation is the same as the operation 2 in FIG. 6.

Operation 3: When a measurement report condition is satisfied, the UE reports RSRP/RSRQ measurement results, and cell identifiers corresponding to the RSRP/RSRQ measurement results to the Macro cell.

Operation 4: The Macro cell determines from the RSRP/RSRQ measurement results whether to enable CoMP, and if CoMP is enabled, then the Macro cell determines a CoMP measurement set according to the RSRP/RSRQ measurement results, the limited size of the CoMP measurement set and other factors.

Operation 5: The Macro cell notifies the cell_1 of the determined CoMP measurement set.

Operation 6: The cell_1 notifies the other transmission points in the CoMP measurement set of a time-frequency resource position at which an SRS is to be received.

Operation 7: The transmission points in the CoMP measurement set (e.g., the cell_1 and the cell_2) receive the SRS signal.

Operation 8: The other transmission points in the CoMP measurement set (e.g., the cell_2) feed SRS signal reception results back to the cell_1 which is the CoMP serving cell, where the feedback result includes transmission point identifiers in addition to an SRS signal receiving quality.

Operation 9: The cell_1 estimates CSI measurement results in the CoMP measurement set from the SRS signal using channel reciprocity, determines a CoMP cooperating set and a CoMP algorithm according to the estimated CSI measurement results in the CoMP measurement set, and selects the CoMP transmission point and CoMP reception point according to the CoMP algorithm and the CSI measurement results.

Operation 10: The cell_1 exchanges CoMP information with the other CoMP participating cells, e.g., the cell_2, and performs CoMP transmission together therewith. The information exchanged between the cell_1 and the other CoMP participating cells is dependent upon the CoMP algorithm, and reference can be made to the corresponding description in the first embodiment for a particular implementation thereof.

Furthermore the Macro cell can further adjust the CoMP measurement set according to the RSRP/RSRQ measurement results, and once the CoMP measurement set is adjusted, the Macro cell needs to notify the cell_1 of the adjusted CoMP measurement set in a flow similar to the flow above, so a detailed description thereof will be omitted here.

Fifth Embodiment

As described in this embodiment, the cell_1 determines a CoMP measurement set according to SRS detection results reported by the other cells, and determines a CoMP cooperating set, a CoMP algorithm, and CoMP transmission points and CoMP reception points in connection with CSI measurement results, reported by the UE, forwarded by the Macro cell so as to enable the cell_1 to perform CoMP with the other cells.

Figure 10:
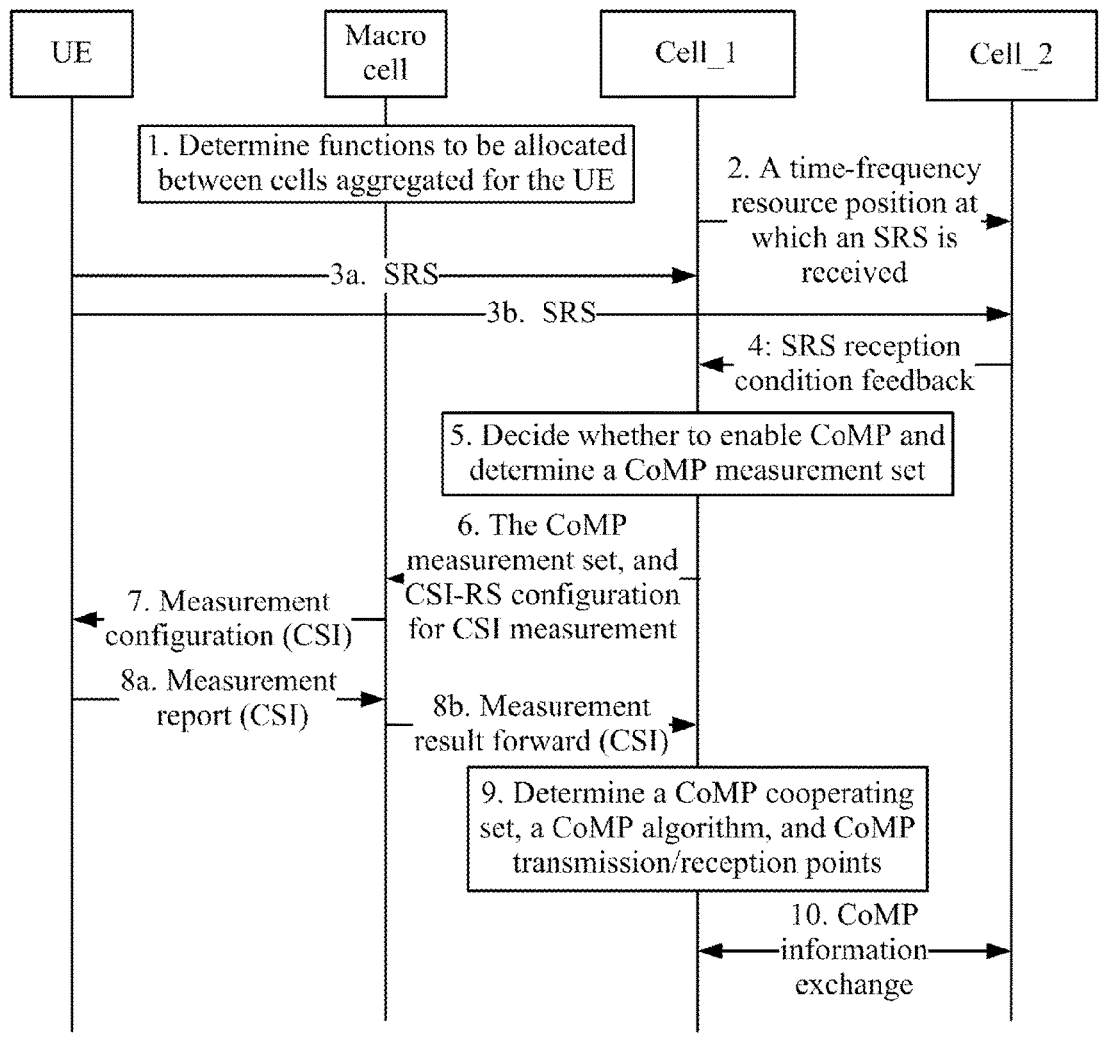
FIG. 10 illustrates a schematic flow chart of CoMP according to a fifth embodiment of the invention.

Referring to FIG. 10, there is illustrated a schematic flow chart of CoMP according to a fifth embodiment of the invention, and as illustrated, the flow can include:

The operation 1 is to determine functions to be allocated between cells aggregated for a UE.

After the UE accesses a network, a Macro cell selects other cells, e.g., the cell_1, which can be aggregated for the UE, according to a traffic condition of the UE, the location of the UE, or a measurement result of the UE, and limits a part of functions (e.g., functions of measurement configuration and measurement result reception) to maintenance by only the macro cell.

Operation 2: The cell_1 instructs the cells adjacent thereto at the same frequency (e.g., the cell_2) to receive an SRS signal. Furthermore the cell_1 can notify the cell_2 of a time-frequency resource position at which the SRS signal is received.

Operations 3 to 4: The UE transmits the SRS signal, and the cells, adjacent to the cell_1, at the same frequency feed reception results back to the cell_1 upon reception of the SRS signal.

Operation 5: The cell_1 determines whether to enable CoMP, according to SRS detection results, and SRS detection results of the other cells adjacent thereto at the same frequency, received by the cell_1, and if CoMP is enabled, then the cell_1 further needs to determine a CoMP measurement set. Furthermore the cell_1 further needs to determine CSI-RS configuration for CSI measurement in the CoMP measurement set after determining the CoMP measurement set.

Operation 6: The cell_1 forwards the CoMP measurement set, and information about the CSI-RS configuration for CSI measurement in the CoMP measurement set to the Macro cell.

Operation 7: The Macro cell configures the UE to make CSI-RS based CSI measurement.

Operations 8a to 8b: When a measurement report condition is satisfied, the UE reports CSI measurement results in the CoMP measurement set to the Macro cell, and the Macro cell forwards the CSI measurement results to the cell_1.

Operation 9: The cell_1 determines a CoMP cooperating set and a CoMP algorithm according to the CSI measurement results in the CoMP measurement set, and selects CoMP transmission points and CoMP reception points according to the CoMP algorithm and the CSI measurement results.

Operation 10: The cell_1 exchanges CoMP information with the other CoMP participating cells, e.g., the cell_2, and performs CoMP transmission together therewith. The information exchanged between the cell_1 and the other CoMP participating cells is dependent upon the CoMP algorithm, and reference can be made to the corresponding description in the first embodiment for a particular implementation thereof.

Optionally the UE can alternatively transmit the CSI measurement results to the cell_1 without forwarding by the Macro cell in the operations 8a to 8b of the flow above.

Optionally the cell_1 can alternatively determine only the CoMP measurement set in the operation 5 of the flow above, but the CSI-RS measurement configuration information can be determined by the Macro cell. If this option is enabled, then only information about the CoMP measurement set needs to be transmitted in the operation 6.

Furthermore the cell_1 can further adjust the CoMP measurement set according to the RSRP and/or RSRQ measurement result in a flow similar to the flow above, so a detailed description thereof will be omitted here.

In summary, the embodiments of the invention provide a CoMP solution so that the CoMP participating cells can perform CoMP even if they can not obtain any RSRP/RSRQ measurement results of the UE or can not obtain any CSI measurement results.

Based upon the same technical idea, embodiments of the invention further provide a network device.

Figure 11:
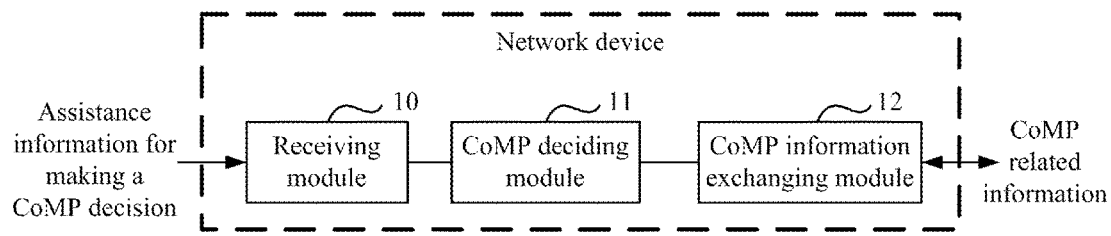
FIG. 11 illustrates a schematic structural diagram of a first network device according to an embodiment of the invention.

Referring to FIG. 11, there is illustrated a schematic structural diagram of a first network device according to an embodiment of the invention, where the network device can operate as a transmission point in a local point clusters and can be configured to manage a CoMP serving cell of a UE in a coordinated multi-point transmission process. The network device can include a receiving module 10, and can further include a CoMP deciding module 11 and a CoMP information exchanging module 12.

The receiving module 10 is configured to receive assistance information transmitted by a CoMP assisting point via an inter-cell interface, the assistance information is utilized for assisting the network device in making a CoMP decision;

The CoMP deciding module 11 is configured to make a CoMP decision according to the assistance information received by the receiving module 10, the CoMP decision includes determining a CoMP cooperating set and a CoMP algorithm and further determining CoMP transmission points, etc.; and The CoMP information exchanging module 12 is configured to exchange CoMP information with other CoMP participating cells according to the CoMP cooperating set and the CoMP algorithm.

Particularly the assistance information includes one of:
RSRP and/or RSRQ measurement results and their corresponding cell identifiers, reported by the UE; and CSI measurement results in a CoMP measurement set reported by the UE; where the RSRP and/or RSRQ measurement results and their corresponding cell identifiers assist the CoMP serving cell in determining the CoMP measurement set, and the CSI measurement results in the CoMP measurement set assist the CoMP serving cell in determining the CoMP cooperating set and the CoMP algorithm;

RSRP and/or RSRQ measurement results, and their corresponding cell identifiers, reported by the UE, where the RSRP and/or RSRQ measurement results and their corresponding cell identifiers assist the CoMP serving cell in determining a CoMP measurement set;

A CoMP measurement set determined by the CoMP assisting point from the RSRP and/or RSRQ measurement results, and their corresponding cell identifiers, reported by the UE; and CSI measurement results in the CoMP measurement set reported by the UE; where the CoMP measurement set assists the CoMP serving cell in obtaining the CSI measurement results in the CoMP measurement set, and the CSI measurement results in the CoMP measurement set assist the CoMP serving cell in determining the CoMP cooperating set and the CoMP algorithm;

A CoMP measurement set determined by the CoMP assisting point from the RSRP and/or RSRQ measurement results, and their corresponding cell identifiers, reported by the UE, where the CoMP measurement set assists the CoMP serving cell in obtaining CSI measurement results in the CoMP measurement set or assists the CoMP serving cell in obtaining SRS detection results in the CoMP measurement set; and CSI measurement results in a CoMP measurement set reported by the UE, where the CSI measurement results in the CoMP measurement set assists the CoMP serving cell in determining the CoMP cooperating set and the CoMP algorithm.

In the event that the assistance information includes the RSRP and/or RSRQ measurement results and their corresponding cell identifiers, and the CSI measurement results in the CoMP measurement set, the CoMP deciding module 11 determines the CoMP measurement set, or determines the CoMP measurement set and measurement configuration information for CSI measurement in the CoMP measurement set, according to the RSRP and/or RSRQ measurement results and their corresponding cell identifiers, forwarded by the CoMP assisting point, configures the UE to make CSI measurement in the CoMP measurement set, through the CoMP assisting point, and determines the CoMP cooperating set and the CoMP algorithm according to the CSI measurement results in the CoMP measurement set forwarded by the CoMP assisting point.

In the event that the assistance information includes the RSRP and/or RSRQ measurement results and their corresponding cell identifiers, the CoMP deciding module 11 determines the CoMP measurement set, or determines the CoMP measurement set and measurement configuration information for CSI measurement in the CoMP measurement set, according to the RSRP and/or RSRQ measurement results and their corresponding cell identifiers, forwarded by the CoMP assisting point, configures the UE to make CSI measurement in the CoMP measurement set, and determines the CoMP cooperating set and the CoMP algorithm according to the CSI measurement results in the CoMP measurement set reported by the UE.

In the event that the assistance information includes the RSRP and/or RSRQ measurement results and their corresponding cell identifiers, the CoMP deciding module 11 determines the CoMP measurement set according to the RSRP and/or RSRQ measurement results, and their corresponding cell identifiers, forwarded by the CoMP assisting point, instructs cells in the CoMP measurement set to detect an SRS, and determines the CoMP cooperating set and the CoMP algorithm according to SRS detection results by the cells in the CoMP measurement set.

In the event that the assistance information includes the CoMP measurement set, and the CSI measurement results in the CoMP measurement set, the CoMP deciding module 11 obtains the CSI measurement results in the CoMP measurement set according to the CoMP measurement set transmitted by the CoMP assisting point, and determines the CoMP cooperating set and the CoMP algorithm according to the CSI measurement results in the CoMP measurement set, where the CSI measurement results are forwarded by the CoMP assisting point after configuring the UE to make CSI measurement, according to the CoMP measurement set determined by the CoMP assisting point, and receiving the CSI measurement results reported by the UE.

In the event that the assistance information includes the CoMP measurement set, the CoMP deciding module 11 obtains the CSI measurement results in the CoMP measurement set according to the CoMP measurement set transmitted by the CoMP assisting point, and determines the CoMP cooperating set and the CoMP algorithm according to the CSI measurement results in the CoMP measurement set, where the CSI measurement results are measured and reported by the UE after the CoMP assisting point or the CoMP serving cell configures the UE to make CSI measurement, according to the determined CoMP measurement set.

In the event that the assistance information includes the CoMP measurement set, the CoMP deciding module 11 instructs cells in the CoMP measurement set to detect an SRS according to the CoMP measurement set transmitted by the CoMP assisting point, and determines the CoMP cooperating set and the CoMP algorithm according to SRS detection results by the cells in the CoMP measurement set.

In the event that the assistance information includes the CSI measurement results in the CoMP measurement set, the CoMP deciding module 11 determines the CoMP cooperating set and the CoMP algorithm according to the CSI measurement results in the CoMP measurement set, where the CoMP cooperating set is determined by the CoMP serving cell according to SRS detection results fed back by cells adjacent to the CoMP serving cell at the same frequency after instructing the adjacent cells at the same frequency to detect an SRS, and the CSI measurement results are transmitted by the UE to the CoMP assisting point, and then forwarded by the CoMP assisting point to the CoMP serving cell, after the CoMP serving cell determines the CoMP measurement set, and configures the UE to make CSI measurement in the CoMP measurement set through the CoMP assisting point.

Reference can be made to the relevant description in the first embodiment for particular details of the corresponding information exchange process performed by the CoMP information exchanging module 12 in the network device above in the CoMP algorithm determined by the CoMP deciding module 11, so a repeated description thereof will be omitted here.

Figure 12A:
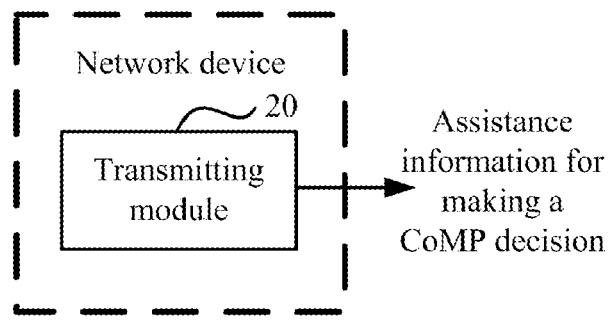
FIG. 12A, FIG. 12B and FIG. 12C illustrate schematic structural diagrams of a second network device according to an embodiment of the invention respectively.

Referring to FIG. 12A, there is illustrated a schematic structural diagram of a second network device according to an embodiment of the invention, where the network device can operate as a CoMP assisting point (e.g., a Macro eNB) and be applied to a coordinated multi-point transmission process. The network device can include a transmitting module 20 configured to transmit assistance information to a CoMP serving cell via an inter-cell interface to assist the CoMP serving cell in making a CoMP decision. Reference can be made to the description above for the assistance information transmitted by the transmitting module 20, so a repeated description thereof will be omitted here.

Figure 12B:
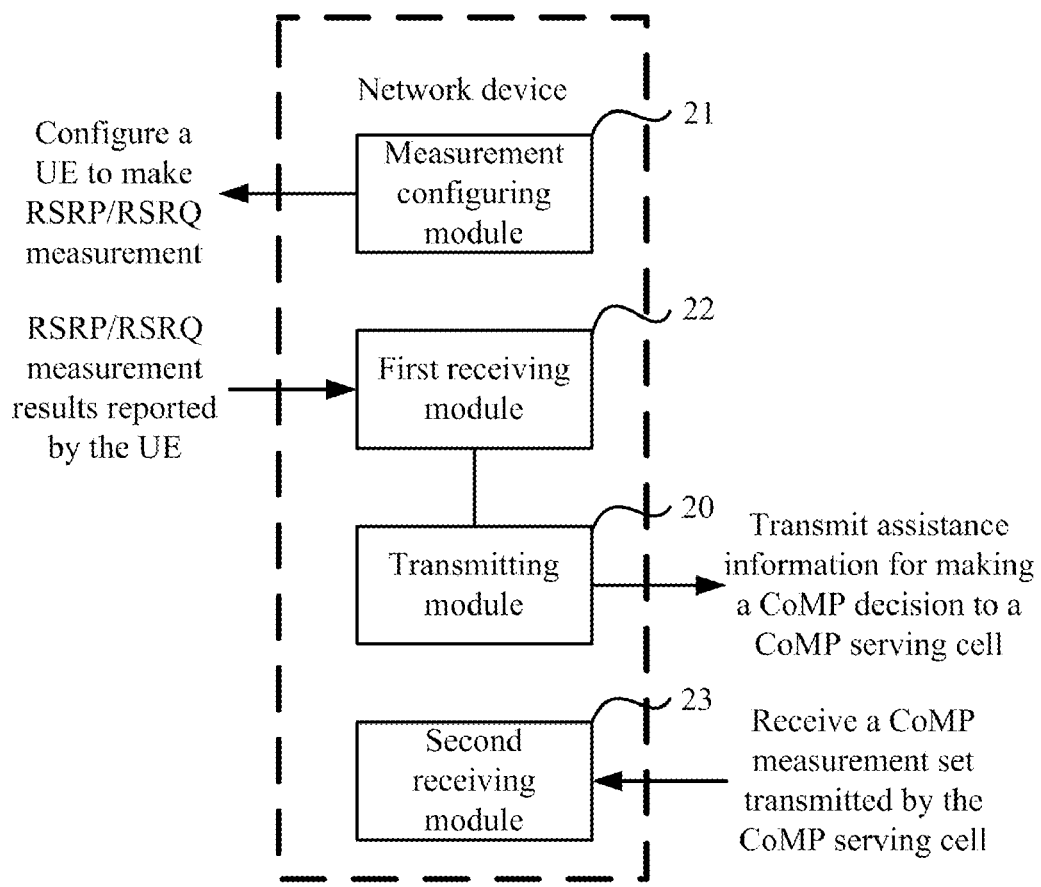

Furthermore as illustrated in FIG. 12B, the second network device can further include a measurement configuring module 21, a first receiving module 22 and a second receiving module 23. The measurement configuring module 21 is configured to configure a UE to make CSR or CSI-RS based RSRP/RSRQ measurement and can further configure the UE to make CSI measurement, according to a CoMP measurement set determined by the CoMP serving cell. The first receiving module 22 is configured to receive measurement results reported by the UE. The second receiving module 23 is configured to receive the CoMP measurement set determined by the CoMP serving cell and can further receive CSI measurement configuration information in the CoMP measurement set determined by the CoMP serving cell.

Figure 12C:
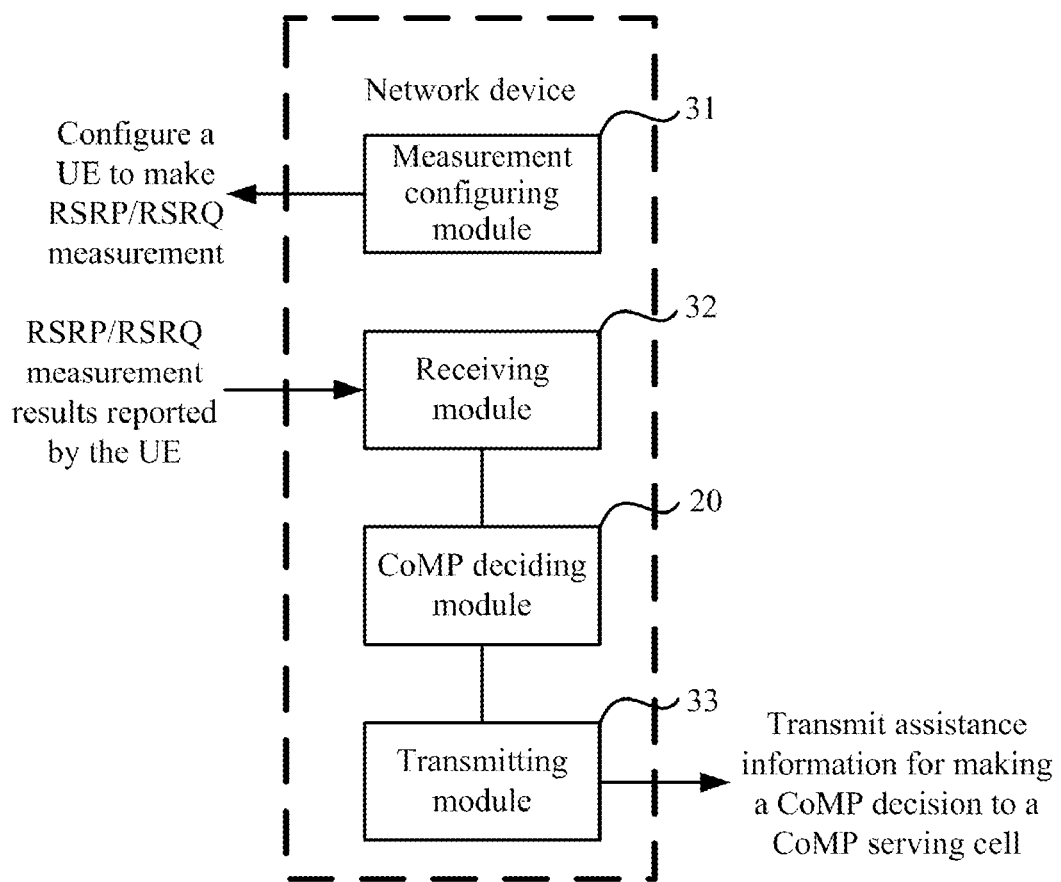

Furthermore as illustrated in FIG. 12C, the second network device can further include a measurement configuring module 31, a receiving module 32 and a CoMP deciding module 33. The measurement configuring module 31 is configured to configure a UE to make CSR or CSI-RS based RSRP/RSRQ measurement and can further configure the UE to make CSI measurement, according to a CoMP measurement set determined by the CoMP deciding module 33. The first receiving module 22 is configured to receive measurement results reported by the UE. Furthermore the CoMP deciding module 33 can determine the CoMP measurement set, and configuration information for CSI measurement in the CoMP measurement set according to RSRP/RSRQ measurement results reported by the UE. The receiving module 32 is configured to receive the measurement results reported by the UE.

Figure 13:
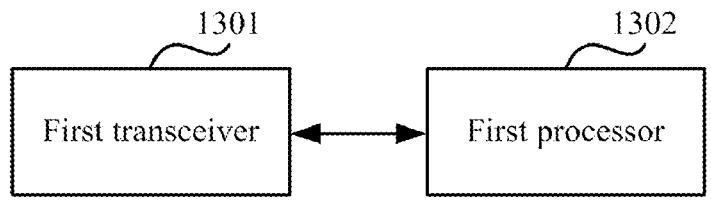
FIG. 13 illustrates a schematic structural diagram of a third network device according to an embodiment of the invention.

Referring to FIG. 13, there is illustrated a schematic structural diagram of a third network device according to an embodiment of the invention, where the network device can operate as a transmission point in a local point clusters and be configured to manage a CoMP serving cell of a UE in a coordinated multi-point transmission process. The network device can include a first transceiver 1301 configured to receive assistance information transmitted by a CoMP assisting point via an inter-cell interface, the assistance information is utilized for assisting the network device in making a CoMP decision.

The network device illustrated in FIG. 13 can further include a first processor 1302 configured to make a CoMP decision according to the assistance information received by the first transceiver 1301, the CoMP decision include determining a CoMP cooperating set and a CoMP algorithm and further determining CoMP transmission points, etc.; and The first transceiver 1301 is further configured to exchange CoMP information with other CoMP participating cells according to the CoMP cooperating set and the CoMP algorithm.

Particularly the assistance information includes one of:

RSRP and/or RSRQ measurement results, and their corresponding cell identifiers, reported by the UE; and CSI measurement results in a CoMP measurement set reported by the UE; where the RSRP and/or RSRQ measurement results and their corresponding cell identifiers assist the CoMP serving cell in determining the CoMP measurement set, and the CSI measurement results in the CoMP measurement set assist the CoMP serving cell in determining the CoMP cooperating set and the CoMP algorithm;

RSRP and/or RSRQ measurement results, and their corresponding cell identifiers, reported by the UE, where the RSRP and/or RSRQ measurement results and their corresponding cell identifiers assist the CoMP serving cell in determining a CoMP measurement set;

A CoMP measurement set determined by the CoMP assisting point from the RSRP and/or RSRQ measurement results, and their corresponding cell identifiers, reported by the UE; and CSI measurement results in the CoMP measurement set reported by the UE; where the CoMP measurement set assists the CoMP serving cell in obtaining the CSI measurement results in the CoMP measurement set, and the CSI measurement results in the CoMP measurement set assist the CoMP serving cell in determining the CoMP cooperating set and the CoMP algorithm;

A CoMP measurement set determined by the CoMP assisting point from the RSRP and/or RSRQ measurement results, and their corresponding cell identifiers, reported by the UE, where the CoMP measurement set assists the CoMP serving cell in obtaining CSI measurement results in the CoMP measurement set or assists the CoMP serving cell in obtaining SRS detection results in the CoMP measurement set; and CSI measurement results in a CoMP measurement set reported by the UE, where the CSI measurement results in the CoMP measurement set assists the CoMP serving cell in determining the CoMP cooperating set and the CoMP algorithm.

In the event that the assistance information includes the RSRP and/or RSRQ measurement results and their corresponding cell identifiers, and the CSI measurement results in the CoMP measurement set, the first processor 1302 determines the CoMP measurement set, or determines the CoMP measurement set and measurement configuration information for CSI measurement in the CoMP measurement set, according to the RSRP and/or RSRQ measurement results, and their corresponding cell identifiers, forwarded by the CoMP assisting point, configures the UE to make CSI measurement in the CoMP measurement set, through the CoMP assisting point, and determines the CoMP cooperating set and the CoMP algorithm according to the CSI measurement results in the CoMP measurement set forwarded by the CoMP assisting point.

In the event that the assistance information includes the RSRP and/or RSRQ measurement results, and their corresponding cell identifiers, the first processor 1302 determines the CoMP measurement set, or determines the CoMP measurement set, and measurement configuration information for CSI measurement in the CoMP measurement set, according to the RSRP and/or RSRQ measurement results, and their corresponding cell identifiers, forwarded by the CoMP assisting point, configures the UE to make CSI measurement in the CoMP measurement set, and determines the CoMP cooperating set and the CoMP algorithm according to the CSI measurement results in the CoMP measurement set reported by the UE.

In the event that the assistance information includes the RSRP and/or RSRQ measurement results, and their corresponding cell identifiers, the first processor 1302 determines the CoMP measurement set according to the RSRP and/or RSRQ measurement results, and their corresponding cell identifiers, forwarded by the CoMP assisting point, instructs cells in the CoMP measurement set to detect an SRS, and determines the CoMP cooperating set and the CoMP algorithm according to SRS detection results by the cells in the CoMP measurement set.

In the event that the assistance information includes the CoMP measurement set, and the CSI measurement results in the CoMP measurement set, the first processor 1302 obtains the CSI measurement results in the CoMP measurement set according to the CoMP measurement set transmitted by the CoMP assisting point, and determines the CoMP cooperating set and the CoMP algorithm according to the CSI measurement results in the CoMP measurement set, where the CSI measurement results are forwarded by the CoMP assisting point after configuring the UE to make CSI measurement, according to the CoMP measurement set determined by the CoMP assisting point, and receiving the CSI measurement results reported by the UE.

In the event that the assistance information includes the CoMP measurement set, the first processor 1302 obtains the CSI measurement results in the CoMP measurement set according to the CoMP measurement set transmitted by the CoMP assisting point, and determines the CoMP cooperating set and the CoMP algorithm according to the CSI measurement results in the CoMP measurement set, where the CSI measurement results are measured and reported by the UE after the CoMP assisting point or the CoMP serving cell configures the UE to make CSI measurement, according to the determined CoMP measurement set.

In the event that the assistance information includes the CoMP measurement set, the first processor 1302 instructs cells in the CoMP measurement set to detect an SRS, according to the CoMP measurement set transmitted by the CoMP assisting point, and determines the CoMP cooperating set and the CoMP algorithm according to SRS detection results by the cells in the CoMP measurement set.

In the event that the assistance information includes the CSI measurement results in the CoMP measurement set, the first processor 1302 determines the CoMP cooperating set and the CoMP algorithm according to the CSI measurement results in the CoMP measurement set, where the CoMP cooperating set is determined by the CoMP serving cell according to SRS detection results fed back by cells adjacent to the CoMP serving cell at the same frequency after instructing the adjacent cells at the same frequency to detect an SRS, and the CSI measurement results are transmitted by the UE to the CoMP assisting point, and then forwarded by the CoMP assisting point to the CoMP serving cell, after the CoMP serving cell determines the CoMP measurement set, and configures the UE to make CSI measurement in the CoMP measurement set through the CoMP assisting point.

Reference can be made to the relevant description in the first embodiment for particular details of the corresponding information exchange process performed by the first transceiver 1301 in the network device above according to the CoMP algorithm determined by the first processor 1302, so a repeated description thereof will be omitted here.

Figure 14:
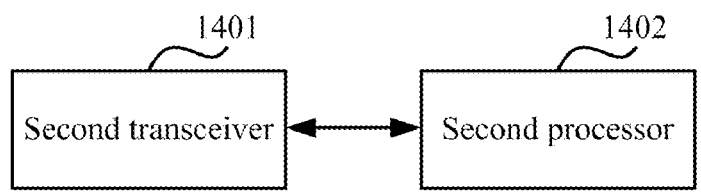
FIG. 14 illustrates a schematic structural diagram of a fourth network device according to an embodiment of the invention.

Referring to FIG. 14, there is illustrated a schematic structural diagram of a fourth network device according to an embodiment of the invention, where the network device can operate as a CoMP assisting point (e.g., a Macro eNB) and be applied to a coordinated multi-point transmission process. The network device can include a second transceiver 1401 configured to transmit assistance information to a CoMP serving cell via an inter-cell interface to assist the CoMP serving cell in making a CoMP decision. Reference can be made to the description above for the assistance information transmitted by the second transceiver 1401, so a repeated description thereof will be omitted here.

Furthermore as illustrated in FIG. 14, the fourth network device can further include a second processor 1402 configured to configure a UE to make CSR or CSI-RS based RSRP/RSRQ measurement and can further configure the UE to make CSI measurement, according to a CoMP measurement set determined by the CoMP serving cell. The second transceiver 1401 is configured to receive measurement results reported by the UE and to receive the CoMP measurement set determined by the CoMP serving cell and can further receive CSI measurement configuration information in the CoMP measurement set determined by the CoMP serving cell.

Furthermore the second processor 1402 is further configured to configure a UE to make CSR or CSI-RS based RSRP/RSRQ measurement and can further configure the UE to make CSI measurement, according to a determined CoMP measurement set. Furthermore the second processor 1402 can further determine the CoMP measurement set, and configuration information for CSI measurement in the CoMP measurement set according to RSRP/RSRQ measurement results reported by the UE. The second transceiver 1401 is configured to receive the measurement results reported by the UE.

It shall be noted that not all the operations and modules in the flows and the respective structural diagrams above will necessarily be required, but some of the operations or the modules may be omitted as needed in practice. The order in which the respective operations are performed are not fixed but may be altered as needed. The devices have been functionally into the respective modules merely for the sake of a convenient description thereof, but in a real implementation, one of the modules can be embodied by a plurality of modules, and the functions of more than one of the modules may be performed by the same module; and these modules may be located in the same device or may be located in different devices. Moreover the terms "first", "second", etc., in the description above are merely intended to facilitate distinguishing two objects with the same definition from each other but will not suggest their any substantive difference from each other.

The hardware modules in the respective embodiments can be embodied mechanically or electrically. For example, a hardware module can include a specifically designed permanent circuit or logic device (e.g., a dedicated processor including an FPGA or an ASIC) configured to perform particular operations. The hardware module can also include a programmable logic device or circuit (including a general-purpose processor or another programmable processor) temporarily configured in software to perform particular operations. The hardware module being embodied mechanically or in a dedicated permanent circuit or in a circuit temporarily configured (e.g., configured in software) can be decided particularly taking time and cost factors into account.

The invention further provides a machine readable storage medium storing thereon instructions configured to cause a machine to perform the methods as described in this context. Particularly a system or a device can be provided with a storage medium storing thereon software program codes configured to perform the functions in any one of the embodiments above, and a computer (or a CPU or an MPU) of the system or the device can be caused to read and execute the program codes stored in the storage medium. Moreover a part or all of the real operations can be performed by an operating system running on the computer based upon the instructions of the program codes. The program codes read from the storage medium can be written into a memory arranged in an expansion board inserted into the computer or written into a memory arranged in an expansion unit connected with the computer, and thereafter a part or all of the real operations can be performed by a CPU installed on the expansion board or the expansion unit based upon the instructions of the program codes, thereby performing the functions in any one of the embodiments above.

Embodiments of the storage medium configured to provide the program codes include a floppy disk, a hard disk, an optic-magnetic disk, an optical disk (e.g., a CD-ROM, a CD-R, a CD-RW, a DVD-ROM, a DVD-RAM, a DVD-RW, a DVD+RW, etc.), a magnetic tape, a nonvolatile memory card, an ROM, etc. Optionally the program codes can be downloaded from a server computer over a communication network.

In summary, the scope of the claims shall not be limited to the embodiments described above, but the description shall be interpreted as a whole and accorded the broadest scope.

The invention claimed is:

1. A coordinated multi-point transmission method, the method comprising:
    receiving, by a Coordinated Multi-point (CoMP) serving cell, assistance information transmitted by a CoMP assisting point via an inter-cell interface, the assistance information is utilized for assisting the CoMP serving cell in making a CoMP decision;
    wherein the assistance information comprises:
    Reference Signal Receiving Power (RSRP) and/or Reference Signal Receiving Quality (RSRQ) measurement results and their corresponding cell identifiers, reported by a User Equipment (UE); and Channel State Information (CSI) measurement results in a CoMP measurement set reported by the UE; wherein the RSRP and/or RSRQ measurement results and their corresponding cell identifiers assist the CoMP serving cell in determining the CoMP measurement set, and the CSI measurement results in the CoMP measurement set assist the CoMP serving cell in determining a CoMP cooperating set and a CoMP algorithm; or
    RSRP and/or RSRQ measurement results and their corresponding cell identifiers, reported by the UE, wherein the RSRP and/or RSRQ measurement results and their corresponding cell identifiers assist the CoMP serving cell in determining a CoMP measurement set; or
    a CoMP measurement set determined by the CoMP assisting point from the RSRP and/or RSRQ measurement results and their corresponding cell identifiers, reported by the UE; and CSI measurement results in the CoMP measurement set reported by the UE; wherein the CoMP measurement set assists the CoMP serving cell in obtaining the CSI measurement results in the CoMP measurement set, and the CSI measurement results in the CoMP measurement set assist the CoMP serving cell in determining a CoMP cooperating set and a CoMP algorithm; or
    a CoMP measurement set determined by the CoMP assisting point from the RSRP and/or RSRQ measurement results and their corresponding cell identifiers, reported by the UE, wherein the CoMP measurement set assists the CoMP serving cell in obtaining CSI measurement results in the CoMP measurement set or assists the CoMP serving cell in obtaining Sound Reference Signal (SRS) detection results in the CoMP measurement set; or
    CSI measurement results in a CoMP measurement set reported by the UE, wherein the CSI measurement results in the CoMP measurement set assists the CoMP serving cell in determining a CoMP cooperating set and a CoMP algorithm;
    wherein,
    in the event that the assistance information comprises the RSRP and/or RSRQ measurement results and their corresponding cell identifiers, and the CSI measurement results in the CoMP measurement set, the method further comprises:

determining, by the CoMP serving cell, the CoMP measurement set, or determining the CoMP measurement set and measurement configuration information for CSI measurement in the CoMP measurement set, according to the RSRP and/or RSRQ measurement results and their corresponding cell identifiers forwarded by the CoMP assisting point, and configuring the UE to make CSI measurement in the CoMP measurement set, through the CoMP assisting point;

determining, by the CoMP serving cell, the CoMP cooperating set and the CoMP algorithm according to the CSI measurement results in the CoMP measurement set forwarded by the CoMP assisting point; and exchanging, by the CoMP serving cell, CoMP information with other CoMP participating cells according to the CoMP cooperating set and the CoMP algorithm;

or, in the event that the assistance information comprises the RSRP and/or RSRQ measurement results and their corresponding cell identifiers, the method further comprises:

determining, by the CoMP serving cell, the CoMP measurement set, or determining the CoMP measurement set and measurement configuration information for CSI measurement in the CoMP measurement set, according to the RSRP and/or RSRQ measurement results and their corresponding cell identifiers forwarded by the CoMP assisting point, and configuring the UE to make CSI measurement in the CoMP measurement set;

determining, by the CoMP serving cell, the CoMP cooperating set and the CoMP algorithm according to CSI measurement results in the CoMP measurement set reported by the UE; and exchanging, by the CoMP serving cell, CoMP information with other CoMP participating cells according to the CoMP cooperating set and the CoMP algorithm;

or, in the event that the assistance information comprises the RSRP and/or RSRQ measurement results and their corresponding cell identifiers, the method further comprises:

determining, by the CoMP serving cell, the CoMP measurement set according to the RSRP and/or RSRQ measurement results and their corresponding cell identifiers, forwarded by the CoMP assisting point;

instructing, by the CoMP serving cell, cells in the CoMP measurement set to detect an SRS, and determining the CoMP cooperating set and the CoMP algorithm according to SRS detection results by the cells in the CoMP measurement set; and exchanging, by the CoMP serving cell, CoMP information with other CoMP participating cells according to the CoMP cooperating set and the CoMP algorithm;

or, in the event that the assistance information comprises the CoMP measurement set and the CSI measurement results in the CoMP measurement set, the method further comprises:

obtaining, by the CoMP serving cell, the CSI measurement results in the CoMP measurement set according to the CoMP measurement set transmitted by the CoMP assisting point;

determining, by the CoMP serving cell, the CoMP cooperating set and the CoMP algorithm according to the CSI measurement results in the CoMP measurement set, wherein the CSI measurement results are forwarded by the CoMP assisting point after the CoMP assisting point configuring the UE to make CSI measurement, according to the CoMP measurement set determined by the CoMP assisting point, and receiving the CSI measurement results reported by the UE; and exchanging, by the CoMP serving cell, CoMP information with other CoMP participating cells according to the CoMP cooperating set and the CoMP algorithm;

or, in the event that the assistance information comprises the CoMP measurement set, the method further comprises:

obtaining, by the CoMP serving cell, the CSI measurement results in the CoMP measurement set according to the CoMP measurement set transmitted by the CoMP assisting point;

determining, by the CoMP serving cell, the CoMP cooperating set and the CoMP algorithm according to the CSI measurement results in the CoMP measurement set, wherein the CSI measurement results are measured and reported by the UE after the CoMP assisting point or the CoMP serving cell configures the UE to make CSI measurement, according to the determined CoMP measurement set; and exchanging, by the CoMP serving cell, CoMP information with other CoMP participating cells according to the CoMP cooperating set and the CoMP algorithm;

or, in the event that the assistance information comprises the CoMP measurement set, the method further comprises:

instructing, by the CoMP serving cell, cells in the CoMP measurement set to detect an SRS, according to the CoMP measurement set transmitted by the CoMP assisting point;

determining, by the CoMP serving cell, the CoMP cooperating set and the CoMP algorithm according to SRS detection results by the cells in the CoMP measurement set exchanging, by the CoMP serving cell, CoMP information with other CoMP participating cells according to the CoMP cooperating set and the CoMP algorithm;

or, in the event that the assistance information comprises the CSI measurement results in the CoMP measurement set, the method further comprises:

determining, by the CoMP serving cell, the CoMP cooperating set and the CoMP algorithm according to the CSI measurement results in the CoMP measurement set, wherein the CoMP measurement set is determined by the CoMP serving cell according to SRS detection results fed back by cells adjacent to the CoMP serving cell at the same frequency after instructing the adjacent cells at the same frequency to detect an SRS, and the CSI measurement results are transmitted by the UE to the CoMP assisting point, and then forwarded by the CoMP assisting point to the CoMP serving cell, after the CoMP serving cell determines the CoMP measurement set, and configures the UE to make CSI measurement in the CoMP measurement set through the CoMP assisting point; and exchanging, by the CoMP serving cell, CoMP information with other CoMP participating cells according to the CoMP cooperating set and the CoMP algorithm.

2. The method according to claim 1, wherein:

if the CoMP algorithm is Downlink Joint Transmission/ Dynamic Point Selection (DL JT/DPS), then the CoMP information comprises at least one of:

a bit stream, transmitted by the CoMP serving cell to the other transmission points in the CoMP cooperating set at the physical layer, and a time-frequency resource over which the bit stream is transmitted; and the position of a starting symbol of a Physical Downlink Shared Channel (PDSCH) indicated by the CoMP serving cell to the other transmission points in the CoMP cooperating set;

if the CoMP algorithm is Downlink Coordinated Scheduling/Beam-forming (DL CS/CB), then the CoMP information comprises at least one of:

beam-forming reference information;

temporal information between the respective transmission points in coordinated scheduling; and coordination information of frequency resources between the respective transmission points in coordinated scheduling;

if the CoMP algorithm is Uplink Joint Reception (UL JR), then the CoMP information comprises at least one of:

time-frequency resource information of Physical Uplink Shared Channel (PUSCH) reception transmitted by the CoMP serving cell to the CoMP reception points; and received bit information fed back by the CoMP reception points to the CoMP serving cell for reception combination; and if the CoMP algorithm is Uplink Joint Transmission/ Beam-forming (UL CS/CB), then the CoMP information comprises at least one of:

beam-forming information exchanged between the CoMP serving cell and the other CoMP participating cells in the CoMP cooperating set; and time-frequency resource coordination information on the respective cells exchanged between the CoMP serving cell and the other CoMP participating cells in the CoMP cooperating set.

3. A network device, comprising:

a processor, and a receiver configured to receive assistance information transmitted by a Coordinated Multi-point (CoMP) assisting point via an inter-cell interface, the assistance information is utilized for assisting the device in making a CoMP decision;

wherein the assistance information comprises:

Reference Signal Receiving Power (RSRP) and/or Reference Signal Receiving Quality (RSRQ) measurement results and their corresponding cell identifiers, reported by a User Equipment (UE); and Channel State Information (CSI) measurement results in a CoMP measurement set reported by the UE; wherein the RSRP and/or RSRQ measurement results and their corresponding cell identifiers assist the CoMP serving cell in determining the CoMP measurement set, and the CSI measurement results in the CoMP measurement set assist the CoMP serving cell in determining a CoMP cooperating set and a CoMP algorithm; or RSRP and/or RSRQ measurement results and their corresponding cell identifiers, reported by the UE, wherein the RSRP and/or RSRQ measurement results and their corresponding cell identifiers assist the CoMP serving cell in determining a CoMP measurement set; or a CoMP measurement set determined by the CoMP assisting point from the RSRP and/or RSRQ measurement results and their corresponding cell identifiers, reported by the UE;

and CSI measurement results in the CoMP measurement set reported by the UE; wherein the CoMP measurement set assists the CoMP serving cell in obtaining the CSI measurement results in the CoMP measurement set, and the CSI measurement results in the CoMP measurement set assist the CoMP serving cell in determining a CoMP cooperating set and a CoMP algorithm; or a CoMP measurement set determined by the CoMP assisting point from the RSRP and/or RSRQ measurement results and their corresponding cell identifiers, reported by the UE, wherein the CoMP measurement set assists the CoMP serving cell in obtaining CSI measurement results in the CoMP measurement set or assists the CoMP serving cell in obtaining Sound Reference Signal (SRS) detection results in the CoMP measurement set; or CSI measurement results in a CoMP measurement set reported by the UE, wherein the CSI measurement results in the CoMP measurement set assists the CoMP serving cell in determining a CoMP cooperating set and a CoMP algorithm;

wherein, in the event that the assistance information comprises the RSRP and/or RSRQ measurement results and their corresponding cell identifiers, and the CSI measurement results in the CoMP measurement set, the processor is configured to determine the CoMP measurement set, or to determine the CoMP measurement set and measurement configuration information for CSI measurement in the CoMP measurement set, according to the RSRP and/or RSRQ measurement results and their corresponding cell identifiers, forwarded by the CoMP assisting point, to configure the UE to make CSI measurement in the CoMP measurement set, through the CoMP assisting point, and to determine the CoMP cooperating set and the CoMP algorithm according to the CSI measurement results in the CoMP measurement set forwarded by the CoMP assisting point; and the processor is configured to exchange CoMP information with other CoMP participating cells according to the CoMP cooperating set and the CoMP algorithm;

or, in the event that the assistance information comprises the RSRP and/or RSRQ measurement results and their corresponding cell identifiers, the processor is configured to determine the CoMP measurement set, or to determine the CoMP measurement set and measurement configuration information for CSI measurement in the CoMP measurement set, according to the RSRP and/or RSRQ measurement results and their corresponding cell identifiers forwarded by the CoMP assisting point, to configure the UE to make CSI measurement in the CoMP measurement set, and to determine the CoMP cooperating set and the CoMP algorithm according to the CSI measurement results in the CoMP measurement set reported by the UE; and the processor is configured to exchange CoMP information with other CoMP participating cells according to the CoMP cooperating set and the CoMP algorithm;

or, in the event that the assistance information comprises the RSRP and/or RSRQ measurement results and their corresponding cell identifiers, the processor is configured to determine the CoMP measurement set according to the RSRP and/or RSRQ measurement results and their corresponding cell identifiers, forwarded by the CoMP assisting point, to instruct cells in the CoMP measurement set to detect an SRS, and to determine the CoMP cooperating set and the CoMP algorithm according to SRS detection results by the cells in the CoMP measurement set; and the processor is configured to exchange CoMP information with other CoMP participating cells according to the CoMP cooperating set and the CoMP algorithm;

or, in the event that the assistance information comprises the CoMP measurement set and the CSI measurement results in the CoMP measurement set, the processor is configured to obtain the CSI measurement results in the CoMP measurement set according to the CoMP measurement set transmitted by the CoMP assisting point, and to determine the CoMP cooperating set and the CoMP algorithm according to the CSI measurement results in the CoMP measurement set, wherein the CSI measurement results are forwarded by the CoMP assisting point after the CoMP assisting point configuring the UE to make CSI measurement, according to the CoMP measurement set determined by the CoMP assisting point, and receiving the CSI measurement results reported by the UE; and the processor is configured to exchange CoMP information with other CoMP participating cells according to the CoMP cooperating set and the CoMP algorithm;

or, in the event that the assistance information comprises the CoMP measurement set, the processor is configured to obtain the CSI measurement results in the CoMP measurement set according to the CoMP measurement set transmitted by the CoMP assisting point, and to determine the CoMP cooperating set and the CoMP algorithm according to the CSI measurement results in the CoMP measurement set, wherein the CSI measurement results are measured and reported by the UE after the CoMP assisting point or the CoMP serving cell configures the UE to make CSI measurement, according to the determined CoMP measurement set; and the processor is configured to exchange CoMP information with other CoMP participating cells according to the CoMP cooperating set and the CoMP algorithm;

or, in the event that the assistance information comprises the CoMP measurement set, the processor is configured to instruct cells in the CoMP measurement set to detect an SRS, according to the CoMP measurement set transmitted by the CoMP assisting point, and to determine the CoMP cooperating set and the CoMP algorithm according to SRS detection results by the cells in the CoMP measurement set; and the processor is configured to exchange CoMP information with other CoMP participating cells according to the CoMP cooperating set and the CoMP algorithm;

or, in the event that the assistance information comprises the CSI measurement results in the CoMP measurement set, the processor is configured to determine the CoMP cooperating set and the CoMP algorithm according to the CSI measurement results in the CoMP measurement set, wherein the CoMP measurement set is determined by the CoMP serving cell according to SRS detection results fed back by cells adjacent to the CoMP serving cell at the same frequency after instructing the adjacent cells at the same frequency to detect an SRS, and the CSI measurement results are transmitted by the UE to the CoMP assisting point, and then forwarded by the CoMP assisting point to the CoMP serving cell, after the CoMP serving cell to determine the CoMP measurement set, and configures the UE to make CSI measurement in the CoMP measurement set through the CoMP assisting point; and the processor is configured to exchange CoMP information with other CoMP participating cells according to the CoMP cooperating set and the CoMP algorithm.

4. The network device according to claim 3, wherein:

if the CoMP algorithm is Downlink Joint Transmission/Dynamic Point Selection (DL JT/DPS), then the information exchanged by the processor comprises at least one of:

a bit stream, transmitted to the other transmission points in the CoMP cooperating set at the physical layer, and a time-frequency resource over which the bit stream is transmitted; and the position of a starting symbol of a Physical Downlink Shared Channel (PDSCH) indicated to the other transmission points in the CoMP cooperating set;

if the CoMP algorithm is Downlink Coordinated Scheduling/Beam-forming (DL CS/CB), then the information exchanged by the processor comprises at least one of:

beam-forming reference information;

temporal information between the respective transmission points in coordinated scheduling; and coordination information of frequency resources between the respective transmission points in coordinated scheduling;

if the CoMP algorithm is Uplink Joint Reception (UL JR), then the information exchanged by the processor comprises at least one of:

time-frequency resource information of Physical Uplink Shared Channel (PUSCH) reception transmitted to the CoMP reception points; and received bit information fed back by the CoMP reception points to the CoMP serving cell for reception combination; and if the CoMP algorithm is Uplink Joint Transmission/Beam-forming (UL CS/CB), then the information exchanged by the processor comprises at least one of:

beam-forming information exchanged with the other CoMP participating cells in the CoMP cooperating set; and time-frequency resource coordination information on the respective cells exchanged with the other CoMP participating cells in the CoMP cooperating set.

* * * * *